US011070667B2

(12) United States Patent
Kreiner et al.

(10) Patent No.: US 11,070,667 B2
(45) Date of Patent: *Jul. 20, 2021

(54) DETECTING A SPOOFED CALL

(71) Applicant: AT&T Intellectual Property I, L.P., Atlanta, GA (US)

(72) Inventors: Barrett Kreiner, Woodstock, GA (US); Ryan Schaub, Norcross, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/855,151

(22) Filed: Apr. 22, 2020

(65) Prior Publication Data

US 2020/0252504 A1 Aug. 6, 2020

Related U.S. Application Data

(63) Continuation of application No. 16/210,367, filed on Dec. 5, 2018, now Pat. No. 10,681,206.

(51) Int. Cl.
*H04M 3/436* (2006.01)
*H04M 3/22* (2006.01)
(Continued)

(52) U.S. Cl.
CPC ...... *H04M 3/2281* (2013.01); *H04L 65/1006* (2013.01); *H04M 3/42059* (2013.01);
(Continued)

(58) Field of Classification Search
None
See application file for complete search history.

(56) References Cited

U.S. PATENT DOCUMENTS

| 5,734,977 A | 3/1998 | Sanmugam |
| 6,738,814 B1 | 5/2004 | Cox et al. |

(Continued)

FOREIGN PATENT DOCUMENTS

| KR | 10-0766598 B1 | 10/2007 |
| KR | 10-0771160 B1 | 10/2007 |

(Continued)

OTHER PUBLICATIONS

Standards and Solutions: Caller ID Spoofing/Robocalling, atis Update Advancing ICT Industry Transformation, atis.org, Fall 2015.https://www.atis.org/01_news_events/newsletters/ATIS_Fall_2015_WEB.pdf Discloses ATIS solutions for "Caller ID Spoofing, Robocall Mitigation Techniques". Last Accessed May 26, 2017. 10 pages.

(Continued)

*Primary Examiner* — Quoc D Tran
(74) *Attorney, Agent, or Firm* — Amin, Turocy & Watson, LLP

(57) ABSTRACT

A system can be operable to receive a call from a communication device and identify whether the call is a spoofed based on, for example, whether a caller party user equipment associated with a caller identification number (caller ID number) is in an "idle" status, whether there are inconsistencies in the geographic location associated with a calling party's network and the geographic location determined to be associated with the caller ID number presented, and whether the phone number presented as the caller ID number is registered with a calling party's network.

20 Claims, 15 Drawing Sheets

(51) Int. Cl.
  *H04M 3/42* (2006.01)
  *H04M 7/00* (2006.01)
  *H04L 29/06* (2006.01)

(52) U.S. Cl.
  CPC ......... *H04M 3/436* (2013.01); *H04M 7/0078* (2013.01); *H04M 2203/6027* (2013.01)

(56) References Cited

U.S. PATENT DOCUMENTS

| | | | |
|---|---|---|---|
| 7,212,620 | B1 | 5/2007 | Mastro |
| 7,295,660 | B1 | 11/2007 | Higginbotham et al. |
| 7,974,395 | B2 | 7/2011 | Abramson et al. |
| 8,094,800 | B1 | 1/2012 | Smith et al. |
| 8,223,751 | B2 | 7/2012 | Gilchrist et al. |
| 8,254,541 | B2 | 8/2012 | Cai |
| 8,374,328 | B2 | 2/2013 | Saha et al. |
| 8,611,875 | B2 | 12/2013 | Mikan et al. |
| 8,626,137 | B1 | 1/2014 | Devitt et al. |
| 8,634,520 | B1 | 1/2014 | Morrison et al. |
| 8,693,347 | B2 | 4/2014 | Elliott et al. |
| 8,774,379 | B1* | 7/2014 | Youngs .............. H04W 12/1206 379/142.02 |
| 8,942,357 | B2 | 1/2015 | Goulet |
| 9,001,985 | B2 | 4/2015 | Cox et al. |
| 9,014,359 | B1 | 4/2015 | Pfeffer et al. |
| 9,060,057 | B1 | 6/2015 | Danis |
| 9,112,731 | B2 | 8/2015 | Cohen |
| 9,125,057 | B2 | 9/2015 | Neal et al. |
| 9,154,597 | B2 | 10/2015 | Cook |
| 9,160,846 | B2 | 10/2015 | Daniel et al. |
| 9,210,559 | B2 | 12/2015 | Edwards et al. |
| 9,241,013 | B2 | 1/2016 | Chow et al. |
| 9,264,536 | B1 | 2/2016 | Saitawdekar et al. |
| 9,277,049 | B1 | 3/2016 | Danis |
| 9,338,289 | B1 | 5/2016 | Goyal et al. |
| 9,357,382 | B2 | 5/2016 | Milstein |
| 9,386,149 | B2 | 7/2016 | Korn |
| 9,398,148 | B1 | 7/2016 | Neuer et al. |
| 9,407,767 | B2 | 8/2016 | Jain et al. |
| 9,426,288 | B2 | 8/2016 | Farrand et al. |
| 9,491,286 | B2 | 11/2016 | Shame |
| 9,516,163 | B2 | 12/2016 | Hickey et al. |
| 9,544,440 | B2 | 1/2017 | Deng et al. |
| 9,723,144 | B1 | 8/2017 | Gao et al. |
| 9,762,728 | B1* | 9/2017 | Cox ....................... H04M 3/382 |
| 9,781,255 | B1 | 10/2017 | Gailloux et al. |
| 9,961,198 | B2 | 5/2018 | Spievak et al. |
| 9,979,816 | B1 | 5/2018 | Davis |
| 10,191,349 | B2 | 1/2019 | Yasumoto |
| 10,681,206 | B1* | 6/2020 | Kreiner ............... H04M 7/0078 |
| 2002/0012426 | A1 | 1/2002 | Gupton |
| 2002/0150091 | A1 | 10/2002 | Lopponen et al. |
| 2003/0072426 | A1 | 4/2003 | Davidson et al. |
| 2003/0138084 | A1 | 7/2003 | Lynam et al. |
| 2004/0107362 | A1 | 6/2004 | RaviShankar et al. |
| 2004/0131164 | A1 | 7/2004 | Gould |
| 2006/0182029 | A1 | 8/2006 | Kealy et al. |
| 2007/0036136 | A1 | 2/2007 | Barclay et al. |
| 2007/0041372 | A1 | 2/2007 | Rao et al. |
| 2007/0081648 | A1 | 4/2007 | Abramson et al. |
| 2007/0127658 | A1 | 6/2007 | Gruchala et al. |
| 2008/0075257 | A1 | 3/2008 | Nguyen et al. |
| 2008/0089501 | A1 | 4/2008 | Benco |
| 2008/0159501 | A1* | 7/2008 | Cai .................... H04M 3/42059 379/142.05 |
| 2008/0292077 | A1 | 11/2008 | Vinokurov et al. |
| 2009/0028310 | A1 | 1/2009 | Anderson |
| 2009/0136013 | A1 | 5/2009 | Kuykendall et al. |
| 2009/0217039 | A1 | 8/2009 | Kurapati et al. |
| 2010/0046730 | A1 | 2/2010 | Salvesen |
| 2010/0183139 | A1 | 7/2010 | McNamara et al. |
| 2011/0040629 | A1 | 2/2011 | Chiu et al. |
| 2012/0287823 | A1 | 11/2012 | Lin |
| 2012/0321064 | A1 | 12/2012 | Czachor, Jr. et al. |
| 2014/0020047 | A1 | 1/2014 | Liebmann et al. |
| 2014/0045456 | A1 | 2/2014 | Ballai et al. |
| 2014/0185786 | A1 | 7/2014 | Korn |
| 2014/0192965 | A1 | 7/2014 | Almeida |
| 2014/0201246 | A1 | 7/2014 | Klein et al. |
| 2015/0023485 | A1 | 1/2015 | Guarriello |
| 2015/0182843 | A1 | 7/2015 | Esposito et al. |
| 2015/0189080 | A1 | 7/2015 | Lin |
| 2015/0358459 | A1 | 12/2015 | Spievak et al. |
| 2015/0373193 | A1 | 12/2015 | Cook |
| 2016/0050316 | A1 | 2/2016 | Jain et al. |
| 2016/0088453 | A1 | 3/2016 | Joo et al. |
| 2016/0309024 | A1 | 10/2016 | Quilici et al. |
| 2016/0335410 | A1 | 11/2016 | Swank |
| 2016/0360036 | A1 | 12/2016 | Ansari |
| 2017/0026515 | A1 | 1/2017 | Bernstein et al. |
| 2018/0102992 | A1 | 4/2018 | Pysanets et al. |
| 2018/0131667 | A1 | 5/2018 | Jain et al. |
| 2018/0249005 | A1* | 8/2018 | Dowlatkhah ......... H04M 3/436 |
| 2018/0295140 | A1 | 10/2018 | Lu et al. |
| 2019/0007553 | A1* | 1/2019 | Noldus ............. H04M 3/42059 |
| 2019/0394331 | A1 | 12/2019 | Benlolo et al. |

FOREIGN PATENT DOCUMENTS

| | | |
|---|---|---|
| KR | 10-0965482 B1 | 4/2010 |
| KR | 10-20110017123 A | 2/2011 |
| KR | 10-20150047378 A | 5/2015 |
| KR | 10-1586031 B1 | 11/2015 |
| KR | 10-1793958 B1 | 11/2017 |
| WO | 0122710 A2 | 3/2001 |
| WO | 2004/043051 A1 | 5/2004 |
| WO | 2017/114541 A1 | 7/2017 |

OTHER PUBLICATIONS

Siluk, Shirley, "Facebook Unveils Hello Dialer App with Caller ID for Android," CRM Daily, crmdaily.com, Apr. 22, 2015. http://www.crmdaily.com/story.xhtml?story_id=01200114POSO Discloses an app from facebook that acts as both "A visual caller ID, Hello lets users block unwanted calls". Last Accessed May 26, 2017. 1 page.

O'Reilly, Dennis, "Screen unwanted calls without one-at-a-time blocking," cnet,cnet.com, Apr. 17, 2014. https://www.cnet.com/howto/screenunwantedcallswithoutoneatatimeblocking/Discloses the "free Nomorobo service and AT&T's Privacy Manager help reduce the number of nuisance calls that aren't blocked by the Do Not Call registry". Last Accessed May 26, 2017. 1 page.

Weisbaum, Herb, "Want to get rid of those $#%@ robocalls? There's an app for that," CNBC, cnbc.com, Jun. 17, 2014. http://www.cnbc.com/2014/06/17/want-togetridoftherobocallstheresanappforthat.html Discloses a series of appps to block unwanted calls. Last Accessed May 26, 2017. 1 page.

Non-Final Office Action received for U.S. Appl. No. for 15/445,876 dated Jun. 25, 2018, 21 pages.

Final Office Action received for U.S. Appl. No. 15/445,876 dated Nov. 20, 2018, 17 pages.

Non-Final Office Action received for U.S. Appl. No. 15/445,881 dated Nov. 15, 2017, 37 pages.

Final Office Action received for U.S. Appl. No. 15/445,881 dated Jun. 12, 2018, 35 pages.

Hossen, Mustafa, et al. "You Can Call but You Can't Hide: Detecting Caller ID Spoofing Attacks." Dependable Systems and Networks Conference, Jun. 2014. 12 pages. https://www.researchgate.net/publication/263847197_You_Can_Call_but_You_Can't_Hide_Detecting_Caller_ID_Spoofing_Attacks.

"Using advanced signaling to detect call center fraud" flowroute®, blog.flowroute.com, Aug. 27, 2015. 7 pages. https://web.archive.org/web/20150905164258/https://blog.flowroute.com/2015/08/27/using-adva nced-sig naling-to-detect-call-center-fraud/.

Non-Final Office Action received for U.S. Appl. No. 16/238,033 dated Apr. 2, 2019, 73 pages.

Non-Final Office Action received for U.S. Appl. No. 16/210,367 dated Apr. 2, 2019, 33 pages.

(56) References Cited

OTHER PUBLICATIONS

Non-Final Office Action received for U.S. Appl. No. 15/445,876 dated Jul. 8, 2019, 29 pages.
Final Office Action received for U.S. Appl. No. 16/210,367 dated Sep. 18, 2019, 13 pages.
Final Office Action received for U.S. Appl. No. 15/445,876 dated Nov. 29, 2019, 22 pages.
Final Office Action received for U.S. Appl. No. 16/238,033 dated Oct. 10, 2019, 30 pages.
Final Office Action received for U.S. Appl. No. 16/238,033 dated Feb. 21, 2020, 49 pages.
Non-Final Office Action received for U.S. Appl. No. 15/445,876 dated Apr. 16, 2020, 24 pages.
Final Office Action received for U.S. Appl. No. 15/445,876 dated Sep. 14, 2020, 36 pages.
U.S. Appl. No. 16/210,367, filed Dec. 5, 2018.
Non-Final Office Action received for U.S. Appl. No. 15/445,876 dated Mar. 12, 2021, 32 pages.

* cited by examiner

DETECTING A SPOOFED CALL

RELATED APPLICATION

The subject patent application is a continuation of, and claims priority to, U.S. patent application Ser. No. 16/210,367 (now U.S. Pat. No. 10,681,206), filed Dec. 5, 2018, and entitled "DETECTING A SPOOFED CALL," the entirety of which application is hereby incorporated by reference herein.

TECHNICAL FIELD

The present application relates generally to the field of privacy, and, for example, to detecting a spoofed call.

BACKGROUND

In today's busy world, receiving calls at inconvenient times can be very annoying, especially if a called party is not interested in the subject matter to which the calls relate, or if the called party receives repeated calls at inopportune times. There has been an increase in the number of automated calls (e.g., robocalls), which can be vexatious, or even fraudulent, in which many calls are automatically directed to called parties by an automated dialer (e.g., robocaller, robotic caller, robocall device, robotic calling device), which typically plays a pre-recorded message for the called parties. Additionally, there are many ways to mask a robocall as a legitimate call by "spoofing" the originating number, such that the automated call appears to a blocking system, as well as called party identities, as coming from a legitimate caller or legitimate source.

There has been some effort to reduce and even limit such calls by enforcing the laws in which called parties on a "do not call" list are not be called. However, most of these automated calls do not even originate from the United States. There are large call centers in remote corners of the world where U.S. laws are inapplicable, or the calling parties simply ignore the applicable laws. Additionally, there have been incidences in which robocall systems have been used maliciously to perpetrate fraudulent transactions. According to the federal communications commission (FCC), it received more than 214,000 complaints about unwanted calls in 2014.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
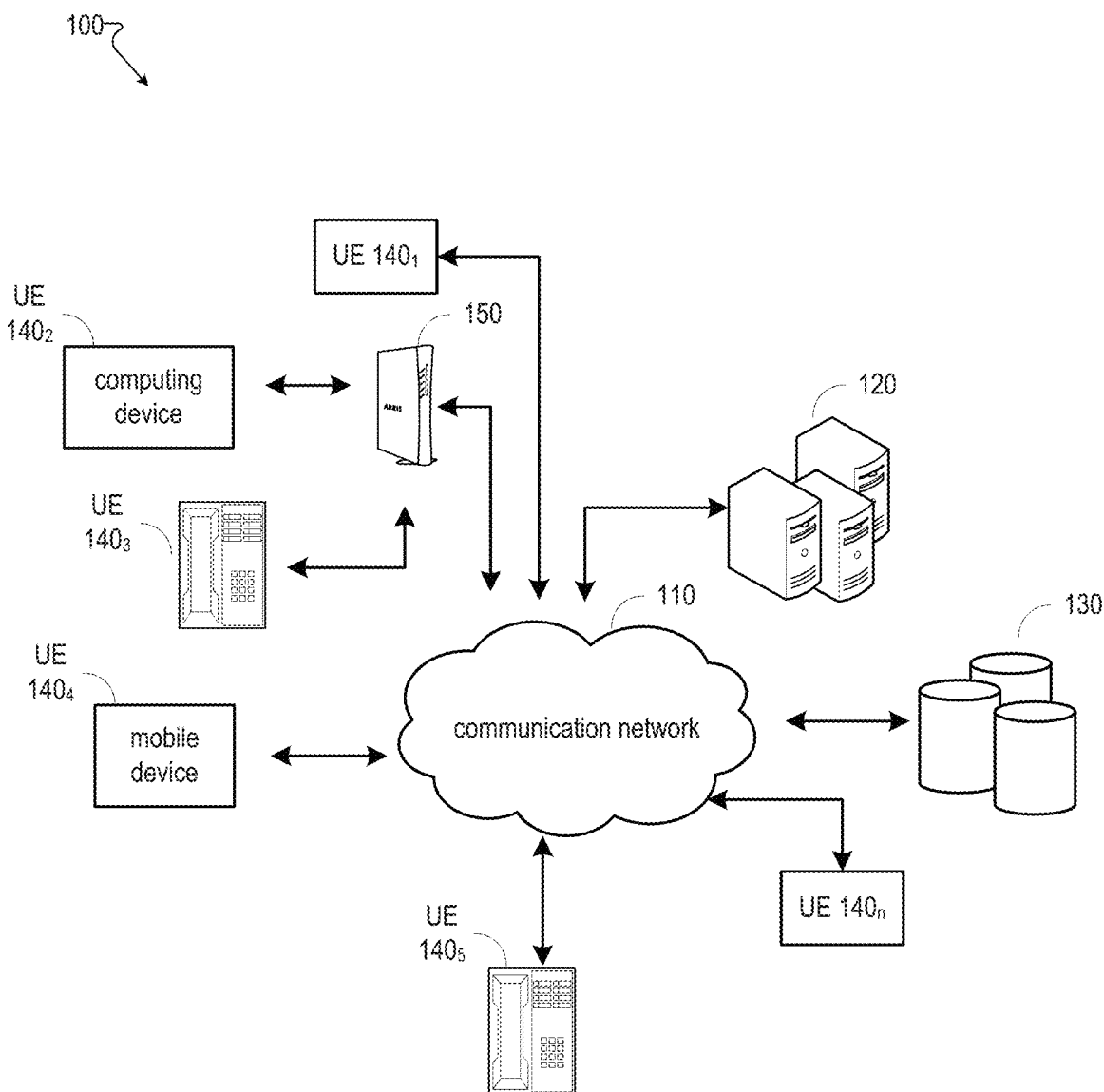
FIG. 1 is a diagram illustrating an example system and networking environment for accessing on-line services and products.

The subject disclosure is now described with reference to the drawings, wherein like reference numerals are used to refer to like elements throughout. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings. In the following description, for purposes of explanation, numerous specific details are set forth to provide a more thorough understanding of the subject disclosure. It might be evident, however, that the subject disclosure can be practiced without these specific details. In other instances, well-known structures and devices are shown in block diagram form to facilitate describing the subject disclosure.

The subject disclosure of the present application describes systems and methods (comprising example computer processing systems, computer-implemented methods, apparatus, computer program products, etc.) for processing a call. The methods (e.g., processes and logic flows) described in this specification can be performed by devices comprising programmable processors that execute machine-executable instructions to facilitate performance of the operations described herein. Examples of such devices are described in the figures herein and can comprise circuitry and components as described in FIG. 14 and FIG. 15. Example embodiments and components can take the form of an entirely hardware embodiment, an entirely software embodiment, or an embodiment combining software and hardware aspects.

Example embodiments are described below with reference to block diagrams and flowchart illustrations of methods, apparatuses, and computer program products. Steps of the block diagrams and flowchart illustrations support combinations of mechanisms for performing the specified functions, combinations of steps for performing the specified functions, and program instructions for performing the specified functions. Example embodiments may take the form of web, mobile, wearable computer-implemented, computer software. It should be understood that each step of the block diagrams and flowchart illustrations, combinations of steps in the block diagrams and flowchart illustrations, or any functions, methods, and processes described herein, can be implemented by a computer executing computer program instructions. These computer program instructions may be loaded onto a general-purpose computer, special purpose computer, combinations of special purpose hardware and other hardware, or other programmable data processing apparatus. Example embodiments may take the form of a computer program product stored on a machine-readable storage medium comprising executable instructions (e.g., software) that, when executed by a processor, facilitate performance of operations described herein. Any suitable machine-readable storage medium may be utilized including, for example, hard disks, compact disks, DVDs, optical data stores, and/or magnetic data stores.

The present application describes systems and methods relating to a spoofing detector (e.g., spoofing detector 810) comprising one or more processors and one or more memories that can store executable instructions that, when executed by a processor, facilitate performance of identifying, authenticating, and processing automated calls, wherein the executable instructions can be comprised of one or more software modules.

FIG. 1 is a diagram illustrating an example of system 100 in which a user equipment can access on-line services provided through one or more server devices having access to one or more data stores, or can make phone calls from a device owned by a calling party identity to a device owned by a called party identity. The system 100 can comprise one or more communications networks (e.g., communication network 110, and as mentioned below, can comprise a calling party's network 510 and a called party's network 520), one or more servers 120, one or more data stores 130 (each of which can contain one or more databases of information), and one or more user equipment ("UE") 1401-N. The servers 120 and user equipment 140, which can be computing devices as described in FIG. 14 and FIG. 15, can execute software modules that can facilitate various functions, methods, and processes described herein.

In example embodiments, the one or more communications networks can be operable to facilitate communication between the server(s) 120, data store(s) 130, and UEs 140. The one or more networks (e.g., communication network 110) may include any of a variety of types of wired or wireless computer networks such as a cellular network, private branch exchange (PBX), private intranet, public switched telephone network (PSTN), plain old telephone service (POTS), satellite network, WiMax, data over cable network (e.g., operating under one or more data over cable service interface specification (DOCSIS)), or any other type of computer or communications network. The communications networks can also comprise, for example, a local area network (LAN), such as an office or Wi-Fi network.

Referring to FIG. 1, the communication network 110 can be a cellular network employing various cellular technologies and modulation schemes to facilitate wireless radio communications between devices. For example, communication network 110 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier 1-DMA (SC-FDMA), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, and citizens broadband radio system (CBRS). However, various features and functionalities of system 100 are particularly described wherein the devices (e.g., the UEs 102 and the network device 104) of system 100 are configured to communicate through wireless signals using one or more multi-carrier modulation schemes, wherein data symbols can be transmitted simultaneously over multiple frequency subcarriers.

In example embodiments, communication network 110 can be configured to provide and employ 5G wireless networking features and functionalities. 5G wireless communication networks are expected to fulfill the demand of exponentially increasing data traffic and to allow people and machines to enjoy gigabit data rates with significantly reduced latency. Compared to 4G, 5G can support more diverse traffic scenarios. For example, in addition to the various types of data communication between conventional UEs (e.g., phones, smartphones, tablets, PCs, televisions, internet enabled televisions, etc.) supported by 4G networks, 5G networks can be employed to support data communication between smart cars in association with driverless car environments, "internet of things" (IoT) devices, as well as machine type communications (MTCs). Considering the drastically different communication resources of these different traffic scenarios, the ability to dynamically configure waveform parameters based on traffic scenarios while retaining the benefits of multi-carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to improved spectrum utilization for 5G networks.

To meet the demand for data centric applications, features of proposed 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. The upcoming 5G access network can also employ an architecture in which a user plane and control plane are separate, wherein complex control plane functions are abstracted from forwarding elements, simplifying user plane operations by relocating control logic to physical or virtual servers.

Still referring to FIG. 1, the communication network 110 can comprise a fixed-packet network. The fixed packet network can be a broadband network using internet protocol (IP) to deliver video, voice, and data. An example of such a network is a cable television (CATV) infrastructure implementing the data over cable service interface specification (DOCSIS) and PacketCable standards, which allow a multiple service operator (MSO) to offer both high-speed internet and voice over internet protocol (VoIP) through an MSO's cable infrastructure. In some implementations, the fixed packet network can have headend equipment such as a cable modem termination system (CMTS) that communicates through one or more hybrid fiber coax (HFC) networks with user premises equipment such as a cable modem or embedded multimedia terminal adapter (EMTA) (see below). The fixed packet network can also comprise networks using asynchronous transfer mode (ATM), digital subscriber line (DSL), or asymmetric digital subscriber line (ADSL) technology. These networks have typically been provided by telephone companies. ATM and DSL/ADSL equipment can be located at an exchange or central office, and can include integrated DSL/ATM switches, multiplexers such as digital subscriber line access multiplexers (DSLAMS), and broadband remote access servers (B-RAS), all of which can contribute to the aggregation of communications from user equipment onto a high-capacity uplink (ATM or Gigabit Ethernet backhaul) to internet service providers (ISPs). Transmission media connecting the central office and user equipment can include both twisted pair and fiber.

The communication network 110 can also comprise a one or more satellite networks, which can enable the exchange of voice, data, and video. In addition to television programming services, satellite networks, such as a DBS (Direct Broadcast Satellite) system, operated by DBS broadcast satellite providers (e.g., Dish Networks, DIRECTV, HughesNet), can be operable to enable high speed internet and voice services.

The communication network 110 can also comprise a POTS network that supports the delivery of voice services employing analog signal transmission over copper loops.

Referring to FIG. 1, servers 120 can be operable to send via communication network 110 executable code capable of generating graphical user interfaces (GUIs) that a user identity can interact with to facilitate the provision of such on-line data, or voice services. The GUIs can be, for example, a webpage that can be displayed (and interacted with) on a user equipment 140. Modules comprising executable instructions that, when executed by a processor of the server 120, facilitate performance of operations, such as the exchange of data or the exchange of voice (e.g., a soft phone), can be stored on a memory device of the server 120 (or a memory device connected to the server 120).

The data stores 130 can comprise physical media for storing information, housed within the one or more servers 120, peripherally connected to the one or more servers, or connected to the servers 120 through one or more networks. For example, the storage device can be connected to the processor of a server, via, for example, a communications medium such as a bus (e.g., SATA, eSATA, SCSI, flash, or the like). As another example, data stores 130 can be peripheral devices, set up as a redundant array of independent disks (RAID) array, a storage area network (SAN), or network attached storage (NAS). The data stores can comprise magnetic memory, such as a hard drive or a semiconductor memory, such as Random Access Memory (RAM), Dynamic RAM (DRAM), non-volatile computer memory, flash memory, or the like. The memory can include operating system, administrative, and database program modules that support the methods and programs disclosed in this application.

Referring to FIG. 1, user equipment 140 can be, for example, a tablet computer, a desktop computer, or laptop computer, a cellular enabled laptop (e.g., comprising a broadband adapter), a handheld computing device, a mobile phone, a telephone, a smartphone, a tablet computer, a wearable device, a virtual reality (VR) device, a heads-up display (HUD) device, an IoT device, and the like.

In example embodiments, a customer premises equipment (CPE) 150 can provide access for the UE (e.g., UE $140_2$) to the one or more networks (e.g., communication network 110). The CPE 150 can comprise a broadband access modem (e.g., cable modem, DSL modem, Wi-MAX modem, satellite modem). The CPE 150 can also comprise a gateway device (also referred to as a residential gateway, home gateway, set top gateway) that processes video, voice packets, and data packets and serves as a broadband connectivity point for various devices (e.g., video set-top boxes, computers, mobile devices, telephones). The UE (e.g., UE $140_2$) can be connected to the CPE device via, for example, an Ethernet interface, or a wireless access point device (which can be embedded within the CPE device, or connected to the CPE device as a peripheral device), which can operate in accordance with the IEEE 802.11 family of standards.

For voice services, a computer (or computing device) connected to a communication network 110 that executes VoIP software can allow for voice calls to be made via a computer application (i.e., a "softphone" such as that offered by Skype). The VoIP software can be provided by one or more servers 120. Additionally, the CPE 150 can be embedded with a VoIP adapter, through which a telephone $140_3$ can connect (e.g., via an RJ-11 phone jack) and make voice calls. Examples of such devices that support voice and data communications are referred to as a telephony modems, embedded multimedia terminal adapters (EMTAs), digital voice modems, voice data modems, voice and internet modems, and the like. In other embodiments, a VoIP adapter can be peripheral to the broadband modem, and the telephone can connect to that VoIP adapter (e.g., an adapter provided by Vonage, Ooma, etc.). In other embodiments, a VoIP adapter can be connected to a computer, for example, via its universal serial bus (USB) port (e.g. an adapter provided by magicJack).

Referring to FIG. 1, a UE $140_4$ can be a mobile device used to make and accept voice calls, including a cellular phone, as well as a tablet with a cellular adapter. The mobile device can be operative to make voice calls through the communication network 110 to other communication devices. Further details describing a mobile device are described below in FIG. 14 below.

The UE 140 can also be a POTS telephone $140_5$ connected to the communication network 110.

Figure 2:
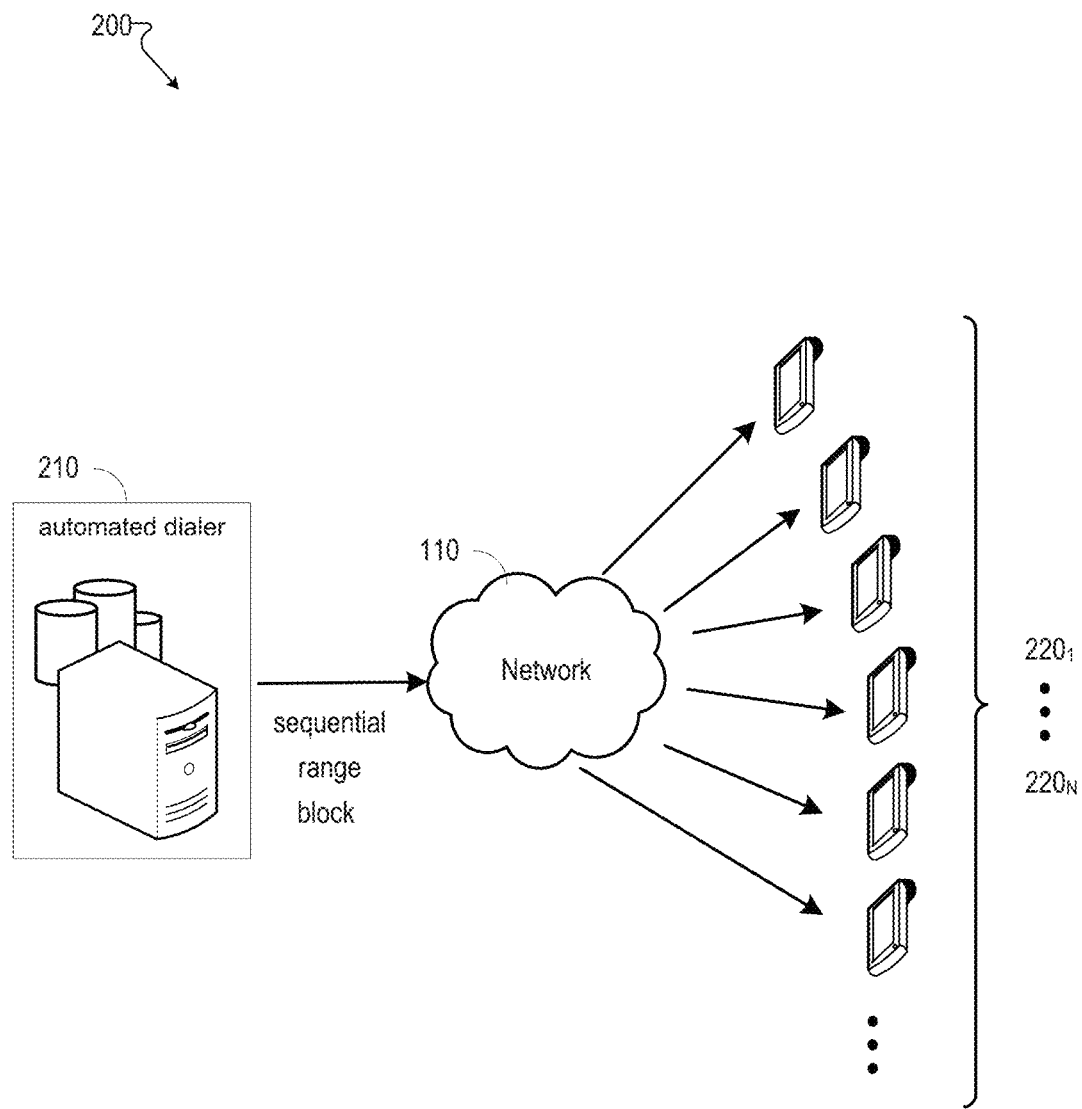
FIG. 2 is a diagram illustrating an example system and networking environment in which an automated dialer calls multiple user equipment.

FIG. 2 is a diagram that illustrates an example networking environment in which a typical automated dialer 210 can be operable to initiate automated calls (e.g., robocalls). Typically, an automated dialer 210 (also referred to as an automated dialer system, automated calling system, robocaller, or predictive dialer) is used in business to consumer (B2C) applications, and can be one or more computers operable to run modules that, when executed, automatically makes voice calls, which can be made simultaneously or in rapid succession, to a plurality of call destinations. The automated dialer 210 can be for example, a UE having a broadband connection and operable to make VoIP calls (e.g., UE $140_2$), and the modules can be locally stored or provided by one or more servers (e.g., servers 120). The automated dialer 210 can make voice calls to called party UEs $220_{1-N}$, which can be one or more UEs 140 (e.g., a cellular phone, a VoIP phone, a POTS phone, etc.) that are operable to answer voice calls. After connection with a called party UE 220 (one of the plurality of called party UEs $220_{1-N}$) the automated dialer 210 plays a pre-recorded message to either the called party identity, or a voicemail system if the called party identity does not answer. A large majority of robocalls originate through a VoIP network. Example vendors of automated dialers and predictive dialers can include Voice2Phone, VoiceShot, Voicent, CallFire and Five9.

Intercepting and blocking unwanted automated calls can be a challenge, in large part because some of these calls are actual public service announcements, such as from the weather service, school system, public safety departments, etc. In other example use cases, large organizations, for example a large religious congregation, might use robocalls as an effective way to distribute pre-recorded messages. Thus, not every robocall is necessarily fraudulent, vexatious, or illegitimate.

Figure 3:
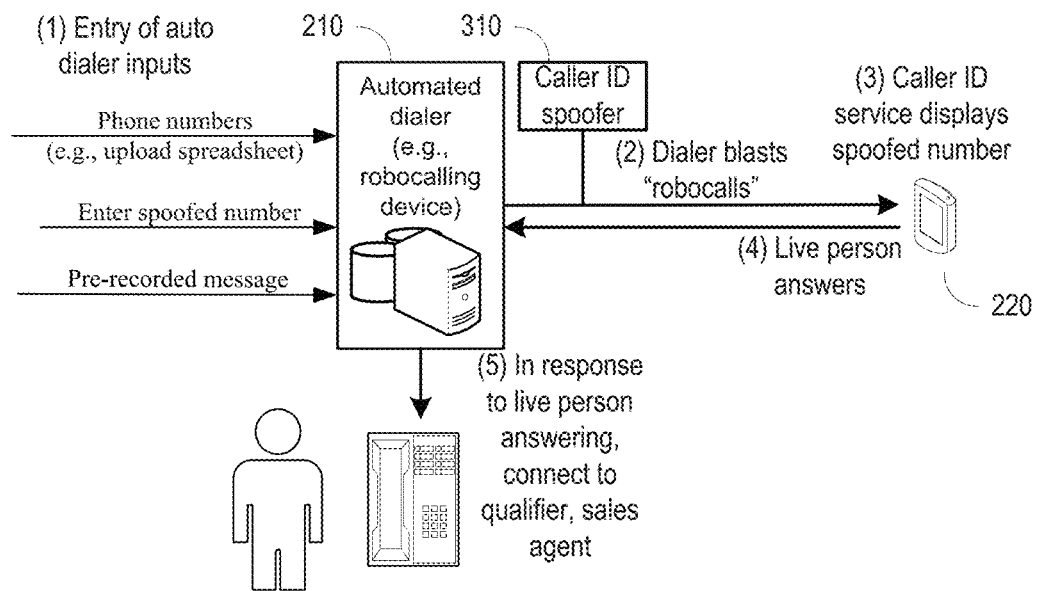
FIG. 3 is a diagram illustrating transactions between an example automated dialer and a called party user equipment.

In FIG. 3, a typical automated dialer 210 (e.g., robocalling device) operated by telemarketing identities, can at transaction (1) receive automated dialer inputs. An automated dialer input can comprise a plurality of target phone numbers corresponding to called party UEs (e.g., UEs $220_{1-N}$). The phone numbers might have been collected from called party identities, who might have provided their phone numbers in response to surveys, purchases, etc. A typical automated dialer 210 allows input of phone numbers manually, as well by uploading a spreadsheet, or some other type of file, having the phone numbers. An automated dialer input can also comprise a pre-recorded message (e.g., an audio file) which can be input by uploading or otherwise transferring the file to the automated dialer 210. The pre-recorded message is played by the automated dialer 210 when the automated call is answered by the called party UE 220 (or its answering service).

At transaction (2) of FIG. 3, the automated dialer 210 can make a multitude of voice calls directed at called party UEs $220_{1-N}$. For illustrative purposes, only one called party UE 220 is shown. The automated dialer 210, with its own spoofing module, or through a caller ID spoofing system 310 provided by another server, can be operable to transmit a "spoofed" number with the call that replaces the originating number of the automated dialer. The spoofed number would show up on a caller ID display. Thus, each call would have associated with it the spoofed caller ID number that was entered at transaction (1). The result is that a number that the marketing identity wants to appear on a called party UE 220's caller ID display, instead of the originating number of the automated call (e.g., number of the calling party), and be entered. The likelihood that an automated call is vexatious, malicious, or fraudulent is extremely high when the calling party is spoofing its number. Many telemarketers (and in some instances, fraudulent companies) are now taking advantage of VoIP, SIP (session-initiated protocol), and network redirection services to make calls using fraudulently obtained (or obtained without authorization) phone numbers to use as a spoofed caller ID number. These obtained numbers might be legitimate numbers (e.g., actual phone numbers) belonging to a third-party identity. The automated dialer 210 can thus mask robocalls as a legitimate call by spoofing the originating number, such that the robocall appears to a call blocking system, caller ID devices, as well as called party identities' devices (e.g., called party UE 220), as coming from the legitimate third-party identity. This tactic has the purpose of encouraging the called party to answer the call as it appears to be from a legitimate caller, instead of a telemarketer or fraudulent caller. It masks the calling party's true phone number to prevent tagging, blocking, or other activities that could reduce the robocalling device's opportunity to connect the call with the called party. Spoofing a call and using another third party's number (e.g., "spoofed victim") though, also can have the consequence of potentially redirecting negative responses back from the called party to a third party whose number was spoofed ("e.g., spoofed victim"), instead of complaints being directed to the actual calling party that is associated with the robocalling device (e.g., automated dialer 210).

In an example case, an automated dialer 210 might direct a call to a called party identity (e.g., "Victim #1). An automated dialer 210 changes the caller ID associated with the call to a phone number not is not the actual number of the automated dialer 210 (e.g., 770-555-0002), which is the phone number of the spoofed party (e.g., "Victim #2") in the expectation that Victim #1 will answer the phone at a higher percentage rate since the caller ID number provided, that of Victim #2, appears to be a valid call and not a robocall. If the phone call is answered by Victim #1, and the content perceived as either vexatious or fraudulent, Victim #1 may report the call, or call back using the identified caller ID number, which would connect Victim #1 with Victim #2, as opposed to the robocaller. Victim #2 might otherwise be unaware that the automated dialer utilized their # on the caller ID. In some instances, there have been calls in which the caller ID number is actually the same as the Victim's own phone number. Additionally, a caller ID spoofing system 310 can randomize the caller ID numbers so that no one number can be blocked or reported by a Victim.

The calls that are made by the auto-dialer can be directed to phone numbers input into the automated dialer 210 at transaction (1), as well as numbers selected by a predictive dialer, which can include numbers in a sequence (dialing numbers in sequential order), a block, or a range. Certain blocks of phone numbers are meant for certain businesses (for example, a block of numbers can be reserved for hospitals), and as such, numbers in particular blocks might be targeted by automated dialers. Numbers in a range are like numbers that are sequentially dialed, but are certain ranges of numbers within a sequence. Automated dialers can sometimes use ranges of numbers to avoid sequence dialing detecting algorithms that attempt to block automated calls (e.g., calling 0000 to 0500 might trigger an alert, but selecting a range of numbers within that sequence might avoid detection). Another characteristic of automated calls might be that the calls were dialed simultaneously, or in rapid succession with a short time-frame between each call (e.g., no pauses, or no significant pauses between calls).

At transaction (3), when a called party UE 220 is dialed, a caller ID service might display the number to the called party identity via the called party UE 220's GUI. If an automated call contained a spoofed number, the spoofed number might appear on the caller ID service (or caller ID device).

A typical automated dialer 210 can be further operative to, in response to a called party identity answering an automated call, connect the called party UE 220 with a qualifier, wherein the qualifier might be an interactive voice response system (IVR) that prompts the called party identity to select or enter information. If certain information entered by the called party to the qualifier indicates that the called party identity's profile matches a profile of the marketing identity's target audience, the automated dialer 210 can be operative to connect the called party UE 220 with a sales agent.

Figure 4:
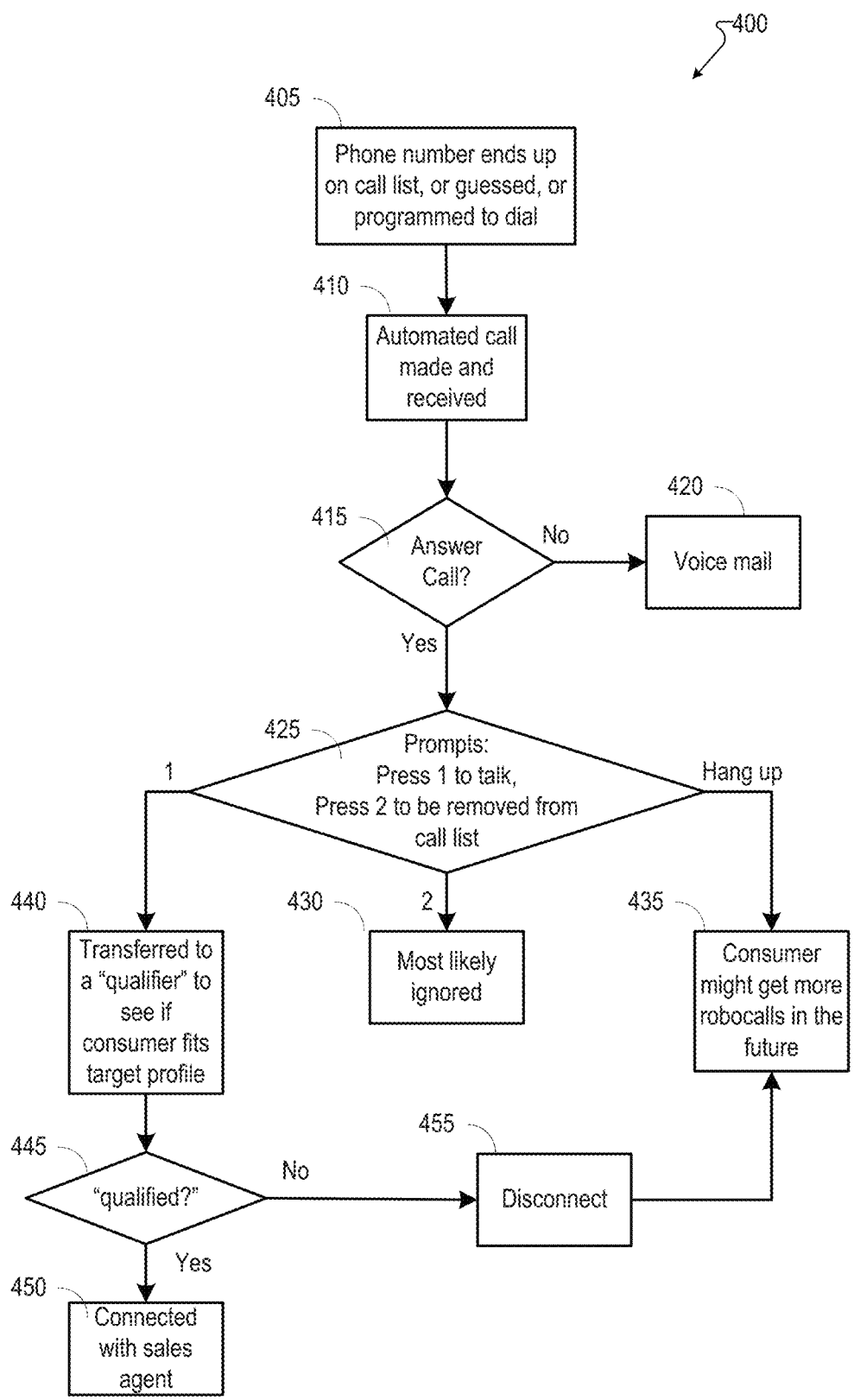
FIG. 4 is a flow chart illustrating an example of a called party's typical experience interacting with an automated dialer.

FIG. 4 illustrates a typical response and experience of a user identity to an automated call. At step 405, the called party identity might have responded to a survey, signed up for an event, filled out an on-line application, or gave approval for a particular service or application to access his or her contact information, wherein the contact information comprises the called party identity's phone number. The called party identity's phone number might eventually wind up on a marketing entity's phone list.

At step 410, the called party identity might receive a phone call (e.g., an incoming call) on his or her phone (e.g., called party UE 220). If the phone is operable to display caller ID information, the calling party's number and name might show up on the caller ID display. However, this number and information might be a spoofed number and spoofed name. The number might have, for example, an area code that is the same as the area code of the called party identity's phone number, such that the called party identity might believe that the calling party is a local identity, such as a nearby friend or neighbor, thereby increasing the probability that the called party identity will answer the automated call.

At step 415, the called party identity can decide whether to answer the call. In response to the user not taking the call, at step 420 the call might be directed to the called party identity's voice mail, in which case the automated dialer 210 plays the prerecorded message related to the subject matter of the sales call.

At step 425, if the called party identity answers the call, the automated dialer 210 plays a prerecorded message briefly describing the goods or services being sold, and then prompts the called party identity to either push a button to speak to a representative or push a button to be removed from the marketer's phone list.

At step 430, in response to a called party identity's selection to be removed from the telemarketer's phone list, the called party identity's selection will most likely be ignored. If the called party entity at step 435 decides to hang up (e.g., end the call), the called party might still get more automated calls in the future. If the called party identity responds by indicating a desire to speak with a representative, the automated dialer 210 might at step 440 connect the user with a qualifier, which can prompt the called party identity to select or enter information. If certain information entered indicates that the called party identity's profile matches a profile of the marketing identity's target audience, the called party identity at step 450 is transferred to a sales agent. If the called party identity's profile does not match, then at step 455 the automated dialer 210 can inform the called party identity that his or her profile does not qualify them for the offer, and then disconnect. After disconnection, as was the case at step 435, the called party identity might still get another automated call in the future. As such, with automated calls, the experience of a called party identity can range from being annoyed, to being angry and frustrated.

In example embodiments of the present application described herein, a spoofed call detection system (e.g., spoofing detector) comprising one or more processors and one or more memories that can store executable instructions (e.g., software) that, when executed by a processor, facilitate performance of determining whether a call directed to a called party has been spoofed, wherein the executable instructions can be comprised of one or more software modules. The spoofing detector can be implemented as a network device, which can comprise one or more servers, one or more data stores, or even within a communications switch. The spoofing detector can comprise, for example, a switch, a server, a computer, etc. residing in the communication network 110, executing software to perform the operations described herein. Regarding the operations, the system can determine whether the originating number is a number that has been spoofed.

Figure 5:
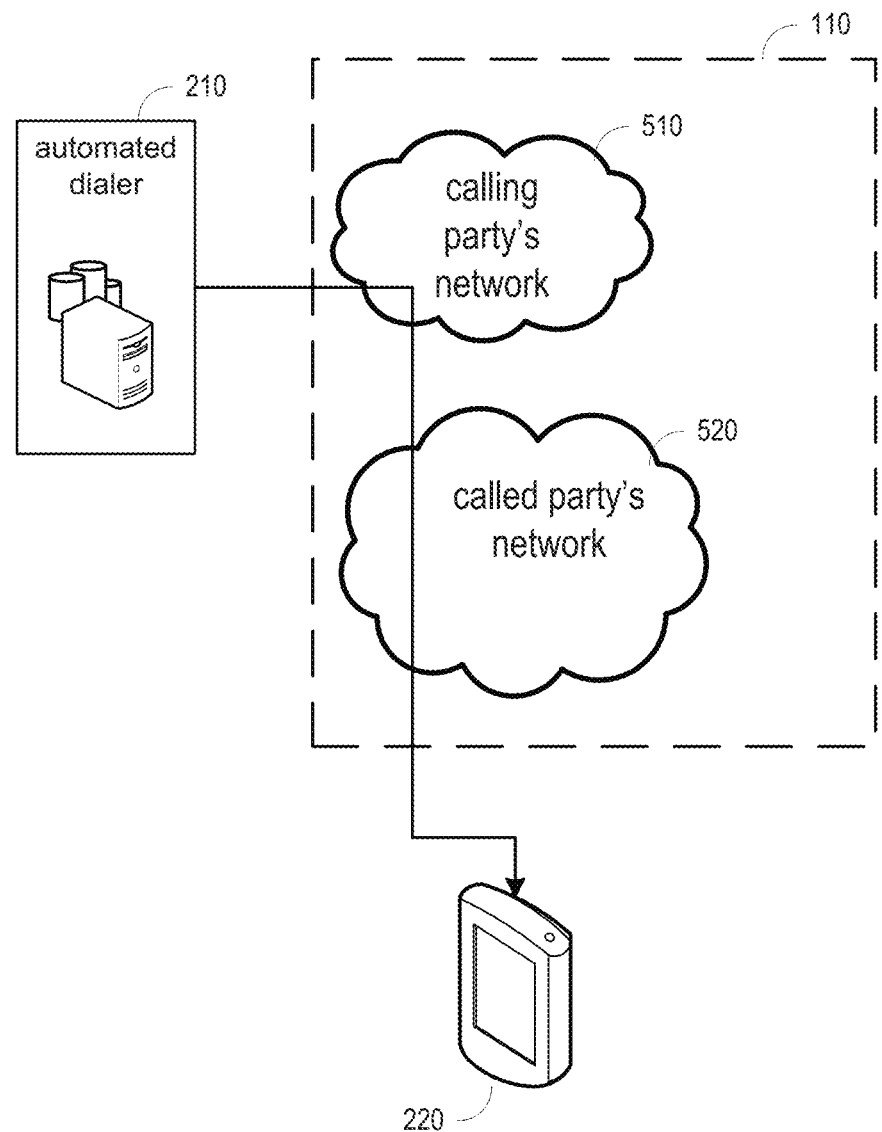
FIG. 5 is a diagram that illustrates a system in which automated dialer is connected to a called party user equipment via a calling party's network and a called party's network.

Phone numbers are serviced, or "owned," by one or more phone networks. As an example, as shown in FIG. 5, a calling party device, which can be automated dialer 210, might be serviced by, as an example Google Voice services, and has a subscriber phone number associated (e.g., registered) with Google Voice services, and when automated dialer 210 make voice calls, it initiates these calls through its originating network (e.g., calling party's network 510), Google Voice services. The call can be routed and connected through, for example, another network (e.g., called party's network 520), which may be, for example, AT&T's network. Thus, in this example, communication network 110 can comprise the calling party's network 510 and the called party's network 520). There is also the possibility that calls are serviced within the same network (e.g., if a calling party and called party are both serviced by AT&T's network), in which case the calling party and called party are serviced by the same network. Additionally, other intermediary networks can be included through which a call is routed.

These phone networks implement the actual connectivity to the end user device by one or more technologies (e.g., circuit, VoIP, and cellular). These connectivity implementations have defined, industry standard sets of signaling for circuit (and virtual circuit) status. These statuses include several states that indicate a receiving line is "off-hook" (or "user busy"), and "idle". This feature can be used during call connections to identify calls with potentially fraudulent caller IDs and filter them from the network.

Figure 6:
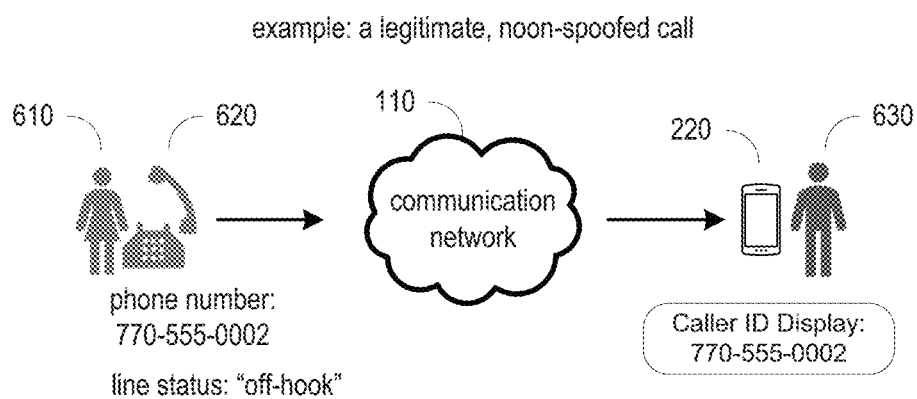
FIG. 6 is a diagram illustrating an example of a legitimate call, wherein the status of the line of a calling party user equipment is off-hook, or busy.

In the example case of a legitimate phone call, as shown in FIG. 6, a calling party identity 610 uses a calling party UE 620 (e.g., which can comprise the same type of device as UE 140$_{1-N}$) to call to a called party UE 220 (which can be one of called party UEs 220$_{1-N}$, which can comprise the same type of device as UEs 140$_{1-N}$ operable to answer voice calls), belonging to a called party identity 630. In this legitimate call (e.g., there is no spoofing) calling party UE 620 would be in one of the several states that grouped together would indicate it is "off-hook" during the call. Additionally, the calling party's original and actual phone number 770-555-

0002 (e.g., the number associated with the called party identity 630 and calling party UE 620), would appear on the called party UE 220's caller ID display as 770-555-0002 (or some other caller ID display, for example, a peripheral caller ID device displaying the caller ID).

Figure 7:
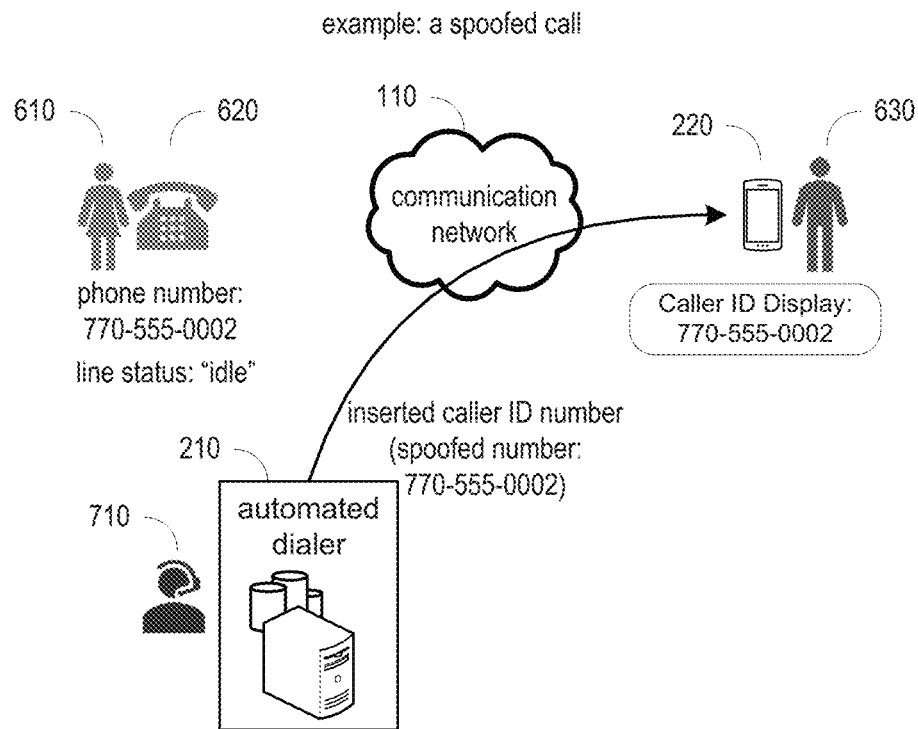
FIG. 7 is a diagram illustrating an example of a spoofed call, wherein the status of the line of a calling party user equipment is idle.

In a spoofed call scenario, as shown in FIG. 7, a telemarketing entity 710 (or, in some cases, a fraudulent identity) directing a robocall to a called party UE (e.g., called party UE 220) belong to a called party identity (e.g., called party identity 630), which we will call Victim #1. The telemarketing entity 710 operates an automated dialer 210 (e.g., robocalling device), or some other communication device, capable of making a spoofed call (e.g., inserting a spoofed number that would be displayed by a caller ID display). It obtains a legitimate party's (Victim #2's) phone number (e.g., the calling party identity 610 from FIG. 6)—770-555-0002 and uses it to spoof a call made to a call destination a Victim #1. When a caller ID display associated with the called party UE 220 displays the number of the caller, it would display the spoofed number—770-555-0002—the number belonging to a Victim #2. In this instance, however, Victim #2's UE (e.g., calling party UE 620), because it did not initiate the call to the called party, might have a line status of "idle." If Victim #2's UE was actually making the call to Victim #1, it would have a line status of "busy" or "off-hook," as shown in FIG. 6.

Figure 8:
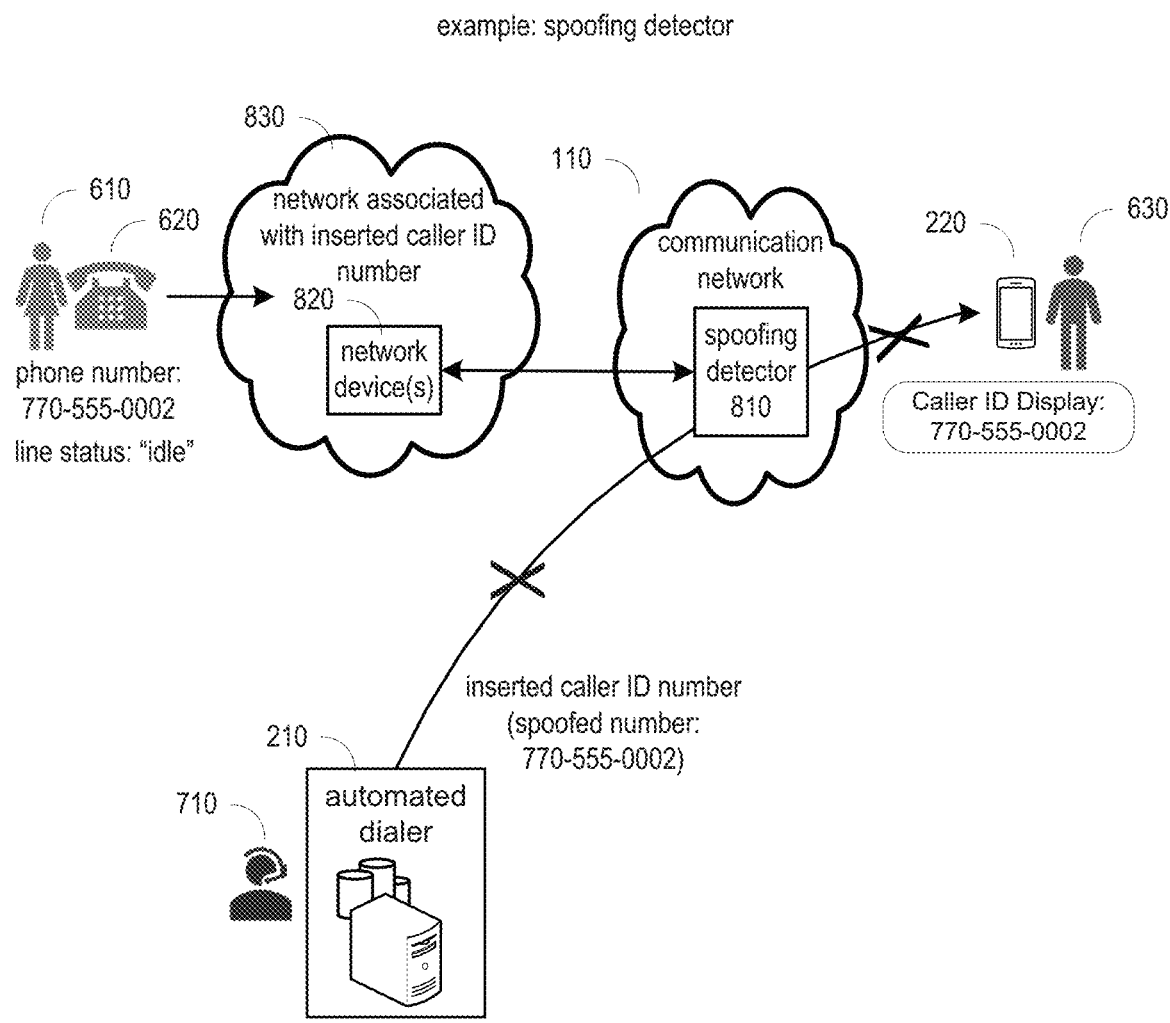
FIG. 8 illustrates an example spoofing detector that determines whether a UE associated with a legitimate party identity is "idle" when a call purports to originate from that UE.

FIG. 8 illustrates an example of a spoofed call detection system (e.g., spoofing detector 810) that facilitates operations comprising the determination as to whether a call has been spoofed, and thus facilitating the identification of automated calls. The operations can comprise detecting a call from a communication device (which may be, e.g., automated dialer 210) and directed to a call destination (e.g., UE 220 associated with called party identity 630, aka Victim #1). The operations can further comprise determining whether the call is a spoofed call by determining whether a user equipment (e.g., calling party UE 620 associated with calling party identity 620, aka, Victim #2) associated with a caller identification number of the call is in an idle state. Determining whether the user equipment is in the idle state can comprise transmitting a message to a network device that services the user equipment, wherein the message is a query to the network device for a state of the user equipment. Transmitting the message can comprise transmitting the message using a session-initiated protocol (e.g., SIP message). The network device can reside in a first service network operated by a first service provider entity (e.g., operated by Google Voice), and the call destination can be associated with a second service network operated by a second service provider entity (e.g., AT&T). The first service network can comprise an internet protocol (e.g., IP) network. The operations can further comprise, in response to the determining indicating that the user equipment is in the idle state, taking a preventative action relating to the call. The preventative action can be, for example, facilitating blocking of the call.

As an illustration of this operation, in the prior example case illustrated in FIG. 7, it is safe to assume that during a legitimate call to Victim #1 (e.g., called party identity 630) from Victim #2 (e.g., legitimate calling party 610), Victim #2's phone would be in one of the several states that grouped together would indicate it is "off-hook" during the call. This state is queryable by the spoofing detector 810. As an example, the spoofing detector 810 can send a query message (e.g., using SIP messaging protocol) to network elements (for example network device(s) 820 residing in the phone network servicing the device (or devices) to which the number that was submitted as the caller ID number belongs 830), and one or more of these network elements can respond to the query by returning the status of the calling party UE 620 (or calling party UEs) associated with Victim #2's phone number (in the case of calling party UEs, sometimes a subscriber might be using a call re-direct service to make a legitimate call using another device—if that device is off hook, it might be an indication that the subscriber is making a call). Or, in a more primitive network, the spoofing detector 810 can facilitate the dialing of the caller ID number (the number of Victim #2) to see if it can be connected to. In the case of a robocaller (or fraudulent caller) utilizing Victim #2's number to spoof the call, if the UE (or UEs) associated with Victim #2's number is verified by the providing network as being "idle," then the call from the automated dialer 210 can be identified as a spoofed call, because if Victim #2's line status is idle, then it can be assumed that no calls are being made from Victim #2, so someone (or some other device not associated with UEs of Victim #2) must be making the call. As such, the call can be identified as either a fraudulent call or a call from a robocaller spoofing the call by presenting Victim #2's number as the caller ID number associated with the call. Once the call has been identified in this manner as being spoofed, preventative measures can be initiated (e.g., by the spoofing detector 810). For example, the call can be blocked (prevented from being completed).

In the event that the query of the spoofing detector 810 returns an indication that the line status associated with Victim #2's device(s) is "off-hook" or "busy," then this is an indication that the placed call might be (although it is not definitive to be) from legitimate calling party identity 610. In one aspect, the call can be allowed to proceed. While the case exists where Victim #2's phone is actually in use for some other reason while the potentially spoofed call is proceeding, this might be considered an edge case, and would only result in the call proceeding, which is no worse than the situation before spoofing detection. Of note, where the UEs of Victim #1, and the UE of Victim #2 are service by the same service network, for example, the queries can be directed by the spoofing detector 810 to network elements within the same service network.

As will be described with respect to FIG. 9 and FIG. 10, other queries can be initiated either prior to, or subsequent to, the determination of the line status of devices associated with a caller ID number associated with a placed call.

Figure 9:
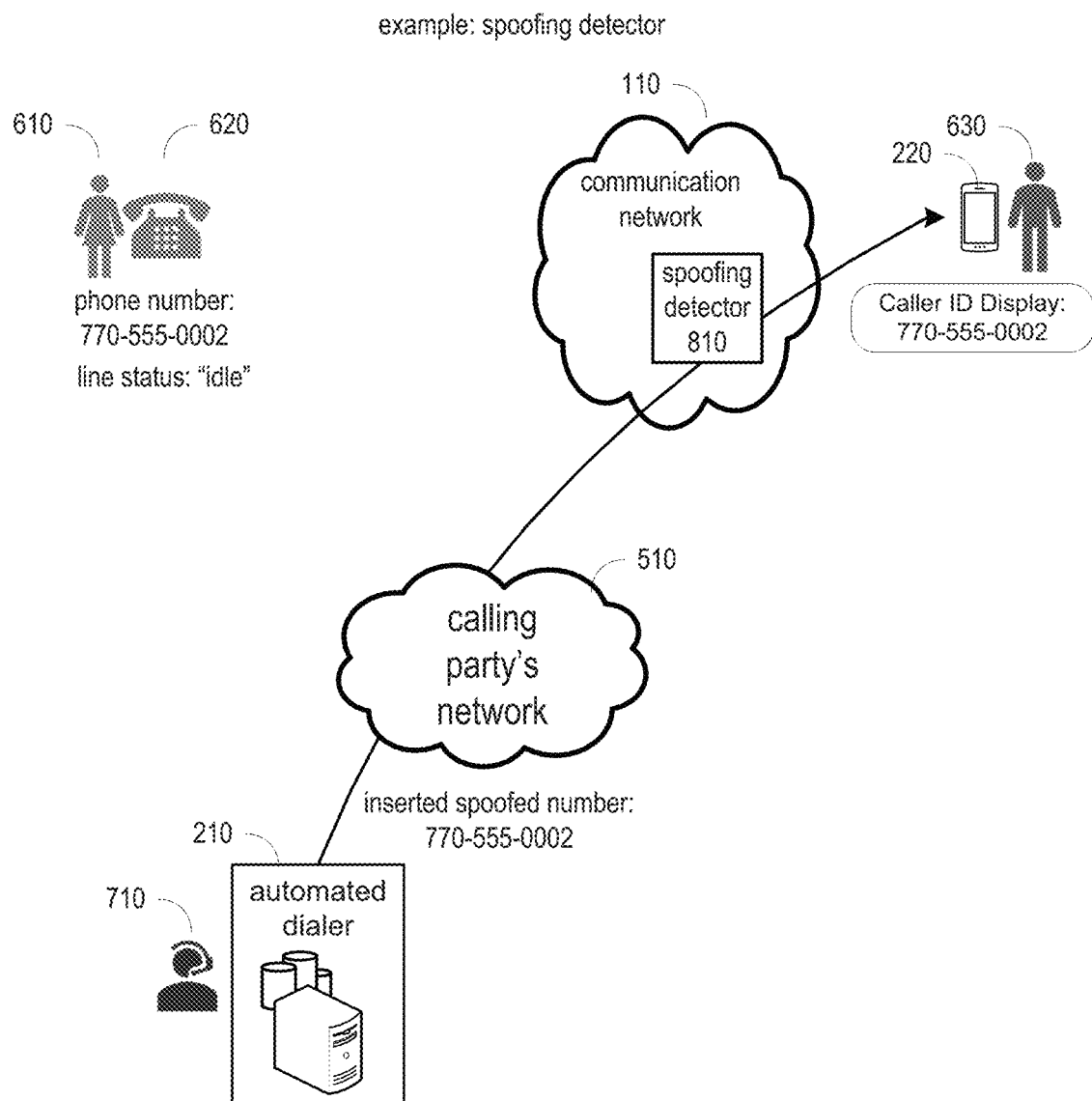
FIG. 9 illustrates an example spoofing detector that determines whether the geographical area associated with a calling party's network is consistent with a caller ID number's geographic location, in accordance with various aspects and embodiments of the subject disclosure.

With regard to FIG. 9, the spoofing detector 810 can initiate other investigations and inquiries as to the legitimacy of the call. The spoofing detector can, in example embodiments, determine the source of the potentially spoofed call. If the call has characteristics of originating from a source inconsistent with the source of the number presented as the caller ID number, then this inconsistency can be a further factor in determining whether to block the call. In example embodiments, this can involve determining a geographic area associated with the first service network associated with the call, determining whether the caller identification number is associated with the geographic area, and, in response to determining that the caller identification number is not associated with the geographic area, facilitating blocking of the call. For example, if the caller ID number is presented as 770-555-0002, then it can be determined that the "770" area code is one of metro Atlanta, Ga. If the call bears indicators (e.g., IP address, data elements, etc.) that it is originating from a calling party's network 510 that is associated with, for example, a foreign country, or even a location other than the geographic location associated with the caller ID number, then the call can be additionally considered spoofed for based on this inquiry.

Figure 10:
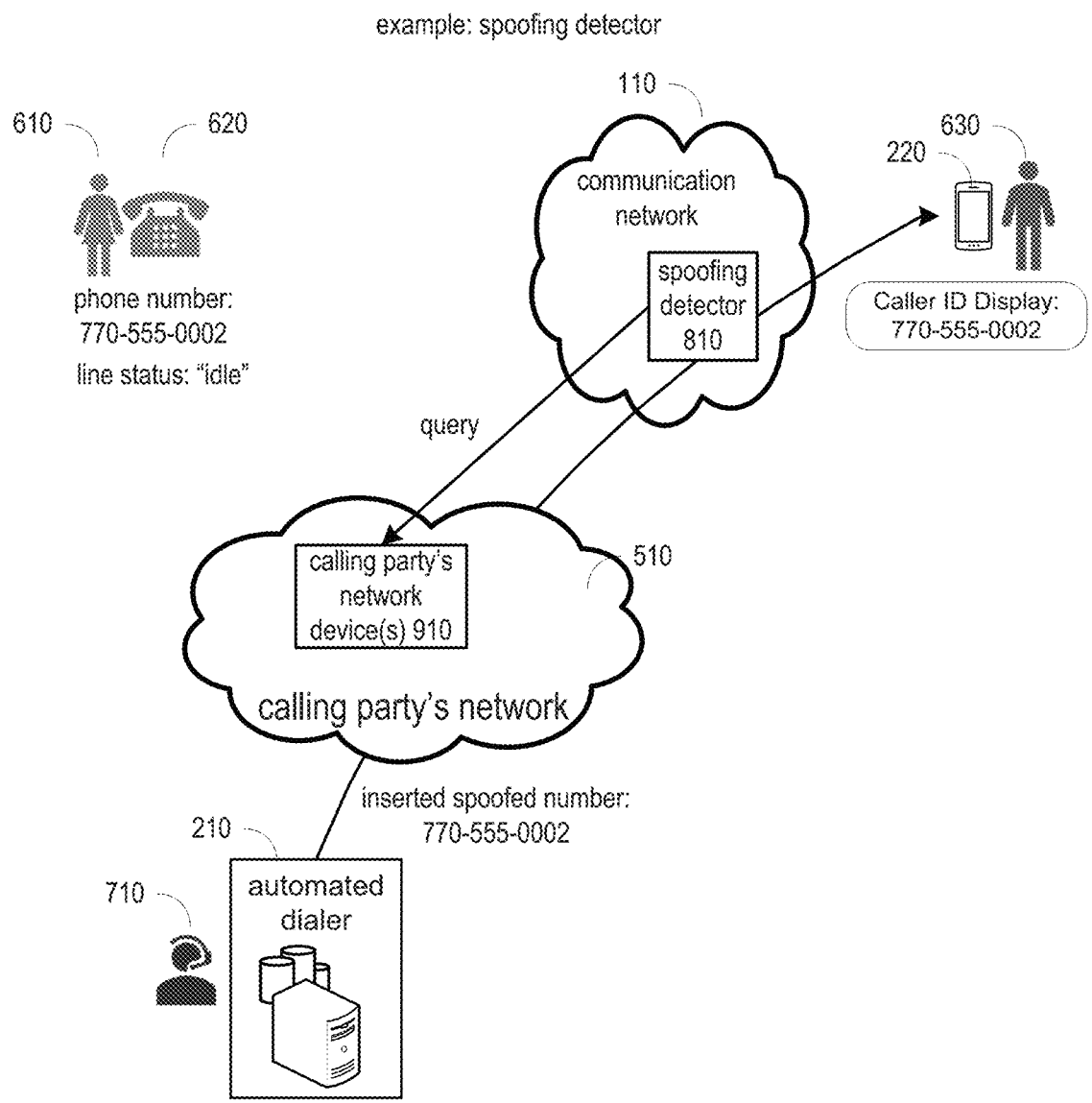
FIG. 10 illustrates an example spoofing detector that determines whether a caller ID number is registered with calling party's network, in accordance with various aspects and embodiments of the subject disclosure.

Referring now to FIG. 10, in the case where a physical circuit is legitimately being serviced by additional virtual network providers, such as Google, Amazon, and Apple voice services, these services can be also check/verified via the same network switching protocols. For example, as shown in FIG. 9, the spoofing detector 810 can check with a calling party's network (e.g., calling party's network 510) to determine whether a number presented as a caller ID number is registered with the calling party's network. The spoofing detector 810 can, for example, query the calling party's network device(s) 910, by sending it a message asking it to verify whether the number presented as the caller ID number is registered with the called party's network. Thus, the spoofing detector 810 can be operable to query the first service network to determine whether the caller identification number is registered with the first service network, and in response to determining that the caller identification number is not registered with the first service network, facilitate blocking the call.

If, for example, the automated dialer 210 spoofed the call with Victim #2's number (770-555-0002), and Victim #2's number is actually serviced by, for example, Google Voice, while the calling party's network is Apple voice, then when the spoofing detector 810 sends a message to the Apple Voice network and queries whether 770-555-0002 is registered with its network, the Apple Voice network will return a negative response. In this situation, the spoofing detector has determined that the call must be spoofed, because if the calling ID number presented was registered with Apple Voice, it would have returned a positive acknowledgement.

Of note, where the robocaller, the UEs of Victim #1, and the UE of Victim #2 are serviced by the same network, for example, the queries would be directed by the spoofing detector to network elements within the same service network.

Figure 11:
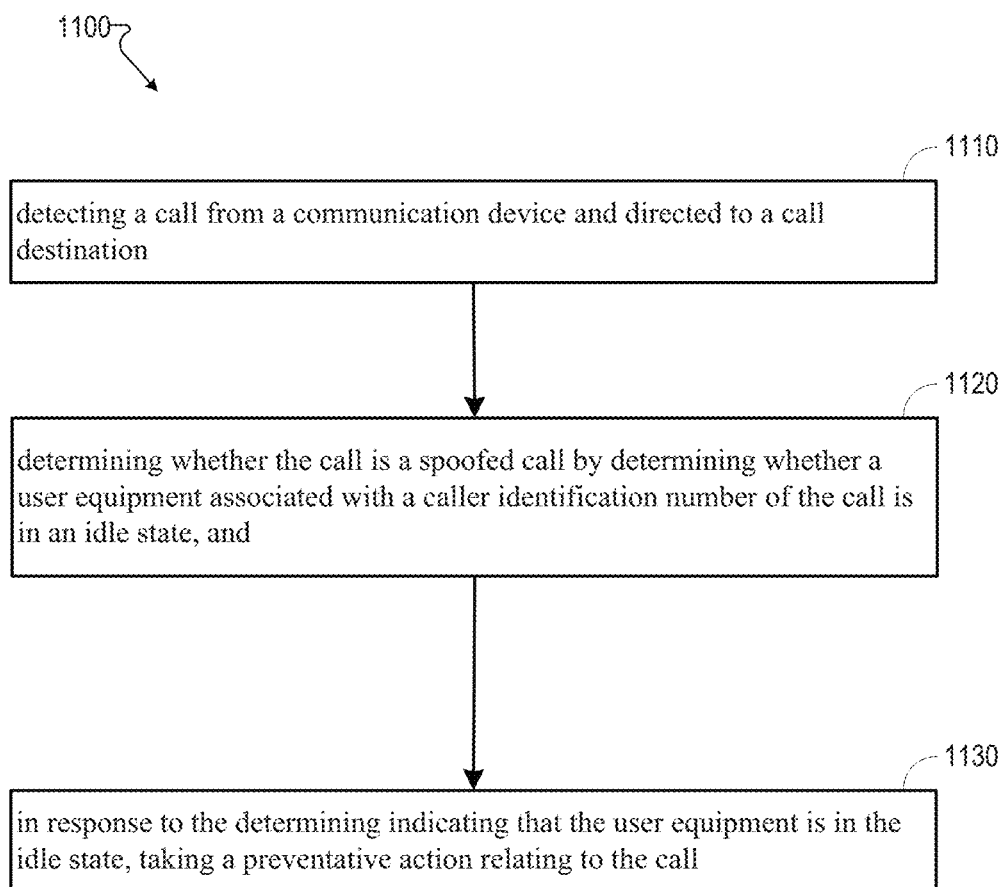
FIG. 11 illustrates a flow diagram of an example spoofing detection operation, in accordance with various aspects and embodiments of the subject disclosure.

Referring now to FIG. 11, in example embodiments a device (e.g., a switch, network device, computer, etc., implemented as spoofing detector 810), comprising a processor and a memory (e.g., machine-readable storage medium (e.g., memory) that stores executable instructions that, when executed by the processor, facilitate performance of operations 1100.

The operations 1100 at step 1110 can comprise detecting a call from a communication device (which may be, e.g., automated dialer 210) and directed to a call destination (e.g., UE 220 associated with called party identity 630, aka Victim #1).

The operations 1100 can further comprise, at step 1120, determining whether the call is a spoofed call by determining whether a user equipment (e.g., calling party UE 620 associated with calling party identity 620, aka, Victim #2) associated with a caller identification number of the call is in an idle state. Determining whether the user equipment is in the idle state can comprise transmitting a message to a network device that services the user equipment, wherein the message is a query to the network device for a state of the user equipment. Transmitting the message can comprise transmitting the message using a session-initiated protocol (e.g., SIP message). The network device can reside in a first service network operated by a first service provider entity (e.g., operated by Google Voice), and the call destination can be associated with a second service network operated by a second service provider entity (e.g., AT&T). The first service network can comprise an internet protocol (e.g., IP) network.

The operations 1100 can further comprise, at step 1130, in response to the determining indicating that the user equipment is in the idle state, taking a preventative action relating to the call. The preventative action can be, for example, facilitating blocking of the call.

In addition to taking a preventative action, or instead of taking a preventative action, the operations can also comprise determining a geography associated with the first service network, and based on the geography, determining whether the caller identification number is associated with the geography. In response to determining that the caller identification number is not associated with the geography, facilitating blocking the call.

The operations can further comprise querying the first service network to determine whether the caller identification number is registered with the first service network. In response to determining that the caller identification number is not registered with the first service network, the operations can comprise facilitating blocking the call.

The operations can further comprise allowing the call to connect to the call destination in response to the call being determined not to be a spoofed call.

Figure 12:
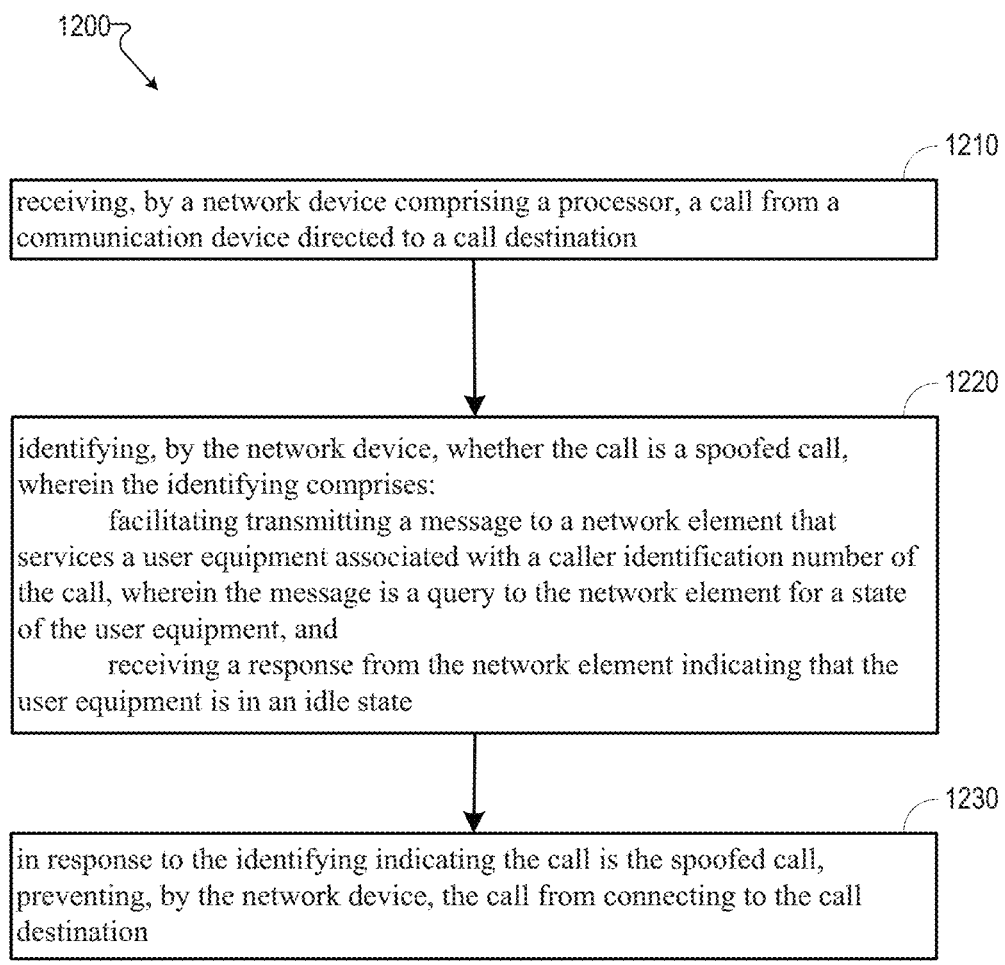
FIG. 12 illustrates another flow diagram of an example spoofing detection operation that can be performed, in accordance with various aspects and embodiments of the subject disclosure.

Moving on to FIG. 12, in example embodiments, operations performed by a network device (e.g., a switch, a server, a computer, etc., implemented as spoofing detector 810) comprising a processor can facilitate performance of operations as illustrated in flow diagram 1200 of FIG. 10. As shown at 1210, the operations can comprise receiving, by a network device comprising a processor, a call from a communication device (which may be, e.g., automated dialer 210) directed to a call destination (e.g., UE 220 associated with called party identity 630, aka Victim #1).

The operations 1200 can further comprise, at step 1220, identifying, by the network device, whether the call is a spoofed call, wherein the identifying comprises facilitating transmitting a message to a network element that services a user equipment associated with a caller identification number of the call, wherein the message queries the network element for a state of the user equipment, and receiving a response from the network element indicating that the user equipment is in an idle state. The transmitting the message can comprise transmitting the message using a session-initiated protocol (e.g., SIP). The network element can be associated with a first service network operated by a first service provider entity, and the call destination can be associated with a second service network operated by a second service provider entity. The first service network can comprise an internet protocol (e.g., IP) network.

The operations 1200 can comprise, at step 1230, in response to the identifying indicating the call is the spoofed call, preventing, by the network device, the call from connecting to the call destination.

The operations 1200 can further comprise, determining, by the network device, a geographic area associated with the first service network, determining, by the network device, whether the caller identification number is associated with the geographic area, and, in response to determining that the caller identification number is not associated with the geographic area, facilitating, by the network device, blocking of the call.

The operations 1200 can further comprise, facilitating, by the network device, querying the first service network to determine whether the caller identification number is registered with the first service network. In response to determining that the caller identification number is not registered with the first service network, facilitating, by the network device, blocking of the call.

Figure 13:
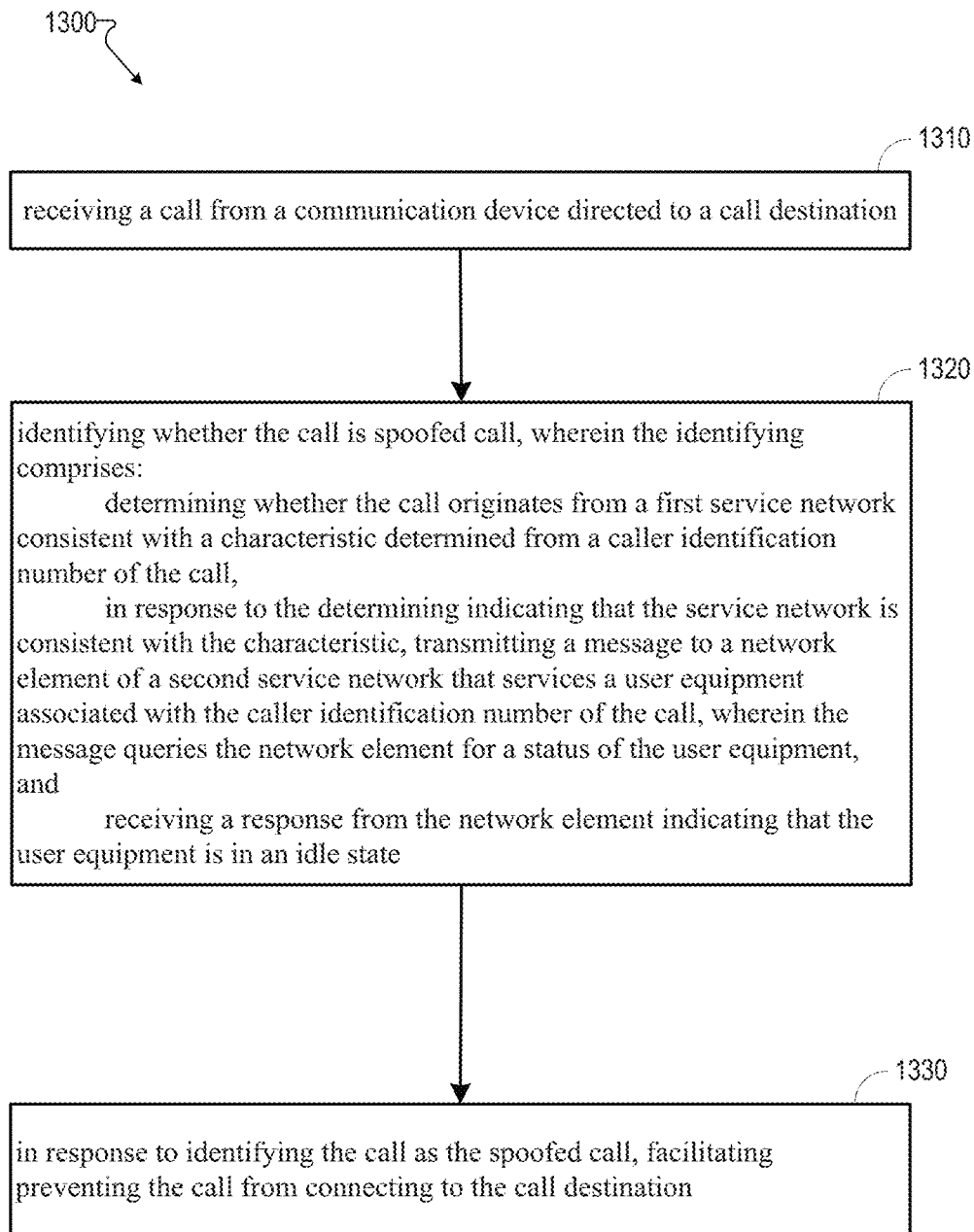
FIG. 13 illustrates an example of an operation related to the detection of spoofed calls, in accordance with various aspects and embodiments of the subject disclosure.

Referring now to FIG. 13, in example embodiments, there is provided a machine-readable storage medium comprising executable instructions that, when executed by a processor (e.g., processor of spoofing detector 810), facilitate performance of operations 1300.

The operations 1300 can comprise, at step 1310, receiving a call from a communication device (which might be, e.g., automated dialer 210) directed to a call destination (e.g., UE 230 associated with called party identity 630, aka, Victim #1).

The operations 1300 at step 1320 can comprise identifying whether the call is spoofed call, wherein the identifying comprises (1) determining whether the call originates from a first service network consistent with a characteristic determined from a caller identification number of the call, (2) in response to the determining indicating that the service network is consistent with the characteristic, transmitting a message (e.g., using SIP protocol)) to a network element of a second service network that services a user equipment associated with the caller identification number of the call, wherein the message queries the network element for a status of the user equipment, and (3) receiving a response from the network element indicating that the user equipment is in an idle state.

The operations 1300, at step 1330, can comprise, in response to identifying the call as the spoofed call, facilitating preventing the call from connecting to the call destination (e.g., blocking the call).

Determining whether the call originates from the first service network consistent with the characteristic can comprise determining a geographic area associated with the first service network, determining whether the caller identification number is associated with the geographic area, and, in response to determining that the caller identification number is not associated with the geographic area, facilitating blocking of the call.

Determining whether the call originates from the first service network consistent with the characteristic further can also comprise querying the first service network to determine whether the caller identification number is registered with the first service network, and in response to determining that the caller identification number is not registered with the first service network, blocking the call.

Figure 14:
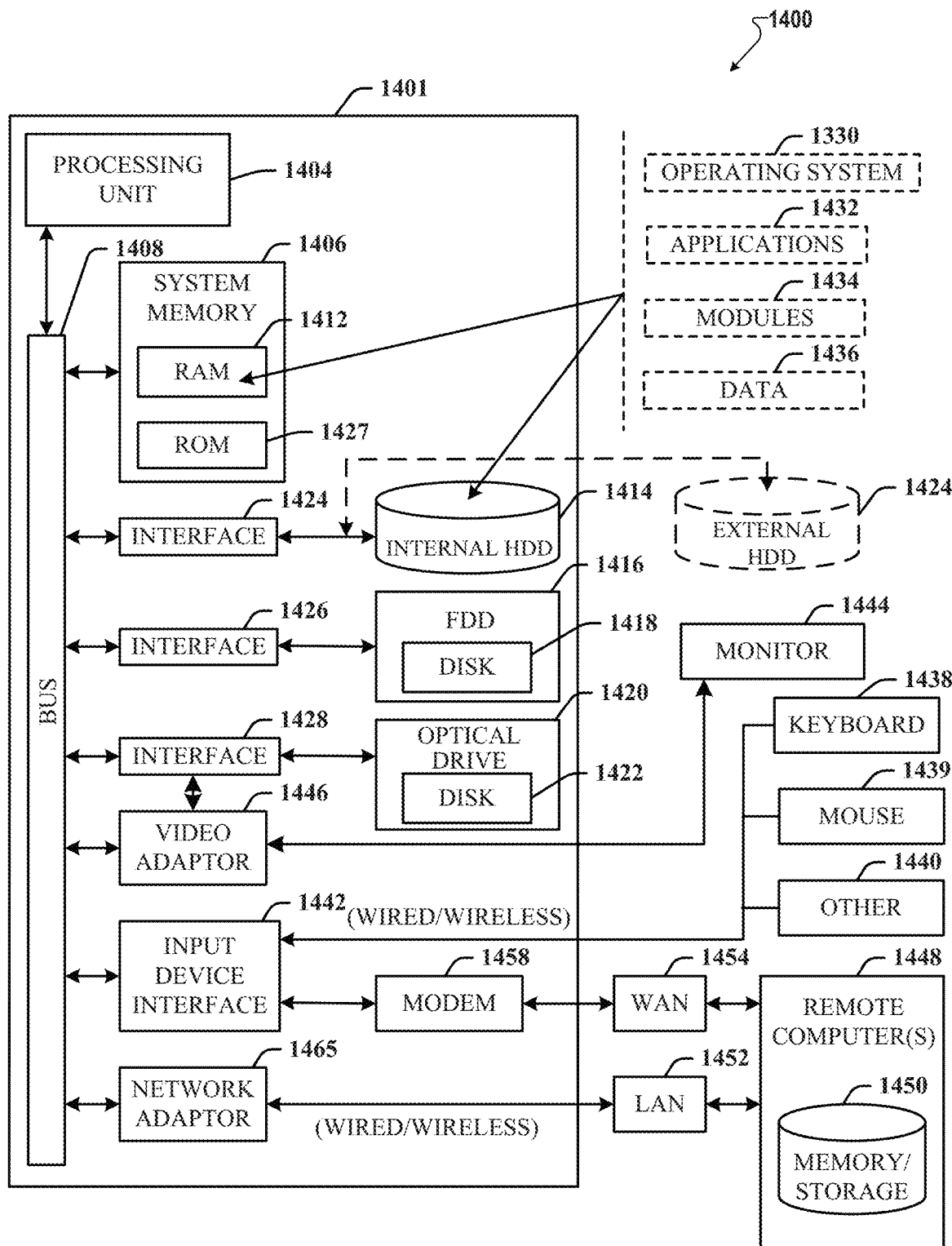
FIG. 14 illustrates a block diagram of an example computer that can be operable to execute processes and methods in accordance with various aspects and embodiments of the subject disclosure.

Referring now to FIG. 14, there is illustrated a block diagram of a computer 1400 operable to execute the functions and operations performed in the described example embodiments. For example, a user device (e.g., called party UE 220), or a spoofing detector (e.g., spoofing detector 810), can contain components as described in FIG. 14. The computer 1400 can provide networking and communication capabilities between a wired or wireless communication network and a server and/or communication device. In order to provide additional context for various aspects thereof, FIG. 14 and the following discussion are intended to provide a brief, general description of a suitable computing environment in which the various aspects of the various embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory data stores.

Computing devices typically include a variety of media, which can include computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic data stores, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 14, implementing various aspects described herein with regards to the network devices (e.g., server 120, switch, etc.), UEs (e.g., UE 140, called party UE 220), and user premises devices (e.g., user premise device 230) can comprise a computer 1400, the computer 1400 comprising a processing unit 1404, a system memory 1406 and a system bus 1408. The system bus 1408 couples system components comprising the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 comprises read-only memory (ROM) 1427 and random access memory (RAM) 1412. A basic input/output system (BIOS) is stored in a non-volatile memory 1427 such as ROM, EPROM, EEPROM, which BIOS contains the basic routines that help to transfer information between elements within the computer 1400, such as during start-up. The RAM 1412 can also include a high-speed RAM such as static RAM for caching data.

The computer 1400 further comprises an internal hard disk drive (HDD) 1414 (e.g., EIDE, SATA), which internal hard disk drive 1414 can also be configured for external use in a suitable chassis (not shown), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). The hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The interface 1424 for external drive implementations comprises at least one or both of Universal Serial Bus (USB) and IEEE 1294 interface technologies. Other external drive connection technologies are within contemplation of the subject embodiments.

The drives and their associated computer-readable media provide nonvolatile storage of data, data structures, computer-executable instructions, and so forth. For the computer 1400 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1400, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1412, comprising an operating system 1430, one or more application programs 1432, other program modules 1434 and program data 1436. All or portions of the operating system, applications, modules, and/or data can also be cached in the RAM 1412. It is to be appreciated that the various embodiments can be implemented with various commercially available operating systems or combinations of operating systems.

A user can enter commands and information into the computer 1400 through one or more wired/wireless input devices, e.g., a keyboard 1438 and a pointing device, such as a mouse 1439. Other input devices 1440 can include a microphone, camera, an IR remote control, a joystick, a game pad, a stylus pen, touch screen, biometric reader (e.g., fingerprint reader, retinal scanner, iris scanner, hand geometry reader, etc.), or the like. These and other input devices are often connected to the processing unit 1404 through an input device interface 1442 that is coupled to the system bus 1408, but can be connected by other interfaces, such as a parallel port, an IEEE 2394 serial port, a game port, a USB port, an IR interface, etc.

A monitor 1444 or other type of display device can also be connected to the system bus 1408 through an interface, such as a video adapter 1446. In addition to the monitor 1444, a computer 1400 typically comprises other peripheral output devices (not shown), such as speakers, printers, etc.

The computer 1400 can operate in a networked environment using logical connections by wired and/or wireless communications to one or more remote computers, such as a remote computer(s) 1448. The remote computer(s) 1448 can be a workstation, a server computer, a router, a personal computer, portable computer, microprocessor-based entertainment device, a peer device or other common network node, and typically comprises many or all of the elements described relative to the computer, although, for purposes of brevity, only a memory/data store 1450 is illustrated. The logical connections depicted include wired/wireless connectivity to a local area network (LAN) 1452 and/or larger networks, e.g., a wide area network (WAN) 1454. Such LAN and WAN networking environments are commonplace in offices and companies, and facilitate enterprise-wide computer networks, such as intranets, all of which can connect to a global communications network, e.g., the internet.

When used in a LAN networking environment, the computer 1400 is connected to the local network 1452 through a wired and/or wireless communication network interface or adapter 1456. The adapter 1456 can facilitate wired or wireless communication to the LAN 1452, which can also include a wireless access point disposed thereon for communicating with the wireless adapter 1456.

When used in a WAN networking environment, the computer 1400 can include a modem 1458, or is connected to a communications server on the WAN 1454, or has other means for establishing communications over the WAN 1454, such as by way of the internet. The modem 1458, which can be internal or external and a wired or wireless device, is connected to the system bus 1408 through the input device interface 1442. In a networked environment, program modules depicted relative to the computer, or portions thereof, can be stored in the remote memory/data store 1450. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the internet, and to wired networks (which use IEEE 802.3 or Ethernet). Wi-Fi networks operate in the unlicensed 2.4 and 5 GHz radio bands and in accordance with, for example, IEEE 802.11 standards, or with products that contain both bands (dual band), so the networks can provide real-world performance similar to the basic "10BaseT" wired Ethernet networks used in many offices.

Figure 15:
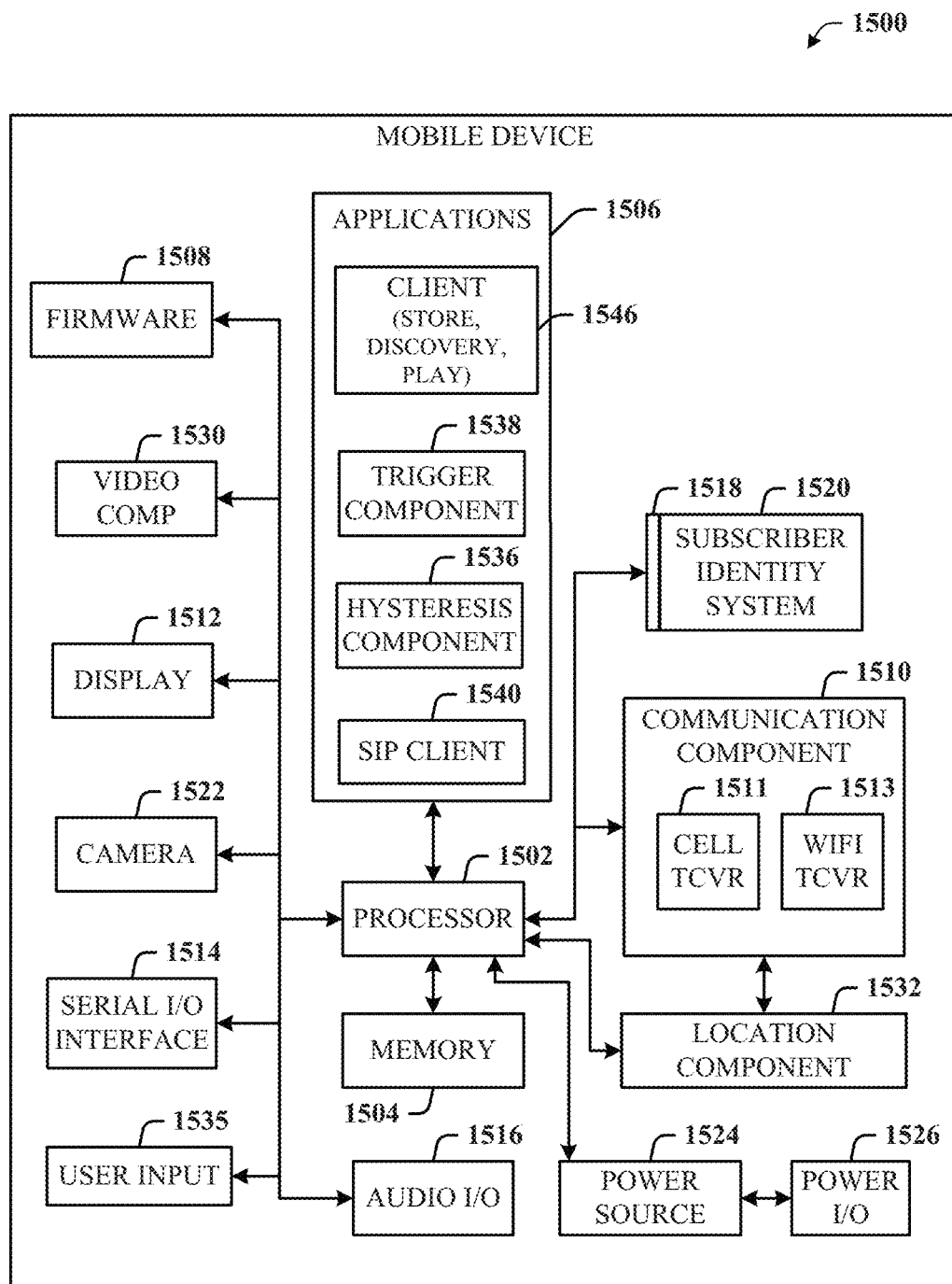
FIG. 15 illustrates a block diagram of an example mobile device that can be operable to execute processes and methods in accordance with various aspects and embodiments of the subject disclosure.

Referring now to FIG. 15, illustrated is a schematic block diagram of a mobile device 1500 (which can be, for example, UE 140, called party UE 220, etc.) capable of connecting to a network in accordance with some embodiments described herein. Although a mobile device 1500 is illustrated herein, it will be understood that other devices can be a mobile device, and that the mobile device 1500 is merely illustrated to provide context for the embodiments of the various embodiments described herein. The following discussion is intended to provide a brief, general description of an example of a suitable environment 1500 in which the various embodiments can be implemented. While the description comprises a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, comprising single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and comprises both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic data stores, or any other medium which can be used to store the desired information and which can be accessed by the computer.

Communication media typically embodies computer-readable instructions, data structures, program modules or other data in a modulated data signal such as a carrier wave or other transport mechanism, and comprises any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared and other wireless media. Combinations of the any of the above should also be included within the scope of computer-readable media.

The mobile device 1500 comprises a processor 1502 for controlling and processing all onboard operations and functions. A memory 1504 interfaces to the processor 1502 for storage of data and one or more applications 1506 (e.g., a video player software, user feedback component software, etc.). Other applications can include voice recognition of predetermined voice commands that facilitate initiation of the user feedback signals. The applications 1506 can be stored in the memory 1504 and/or in a firmware 1508, and executed by the processor 1502 from either or both the memory 1504 or/and the firmware 1508. The firmware 1508 can also store startup code for execution in initializing the mobile device 1500. A communications component 1510 interfaces to the processor 1502 to facilitate wired/wireless communication with external systems, e.g., cellular networks, VoIP networks, and so on. Here, the communications component 1510 can also include a suitable cellular transceiver 1511 (e.g., a GSM transceiver) and/or an unlicensed transceiver 1513 (e.g., Wi-Fi, WiMax) for corresponding signal communications. The mobile device 1500 can be a device such as a cellular telephone, a PDA with mobile communications capabilities, and messaging-centric devices. The communications component 1510 also facilitates communications reception from terrestrial radio networks (e.g., broadcast), digital satellite radio networks, and internet-based radio services networks.

The mobile device 1500 comprises a display 1512 for displaying text, images, video, telephony functions (e.g., a Caller ID function), setup functions, and for user input. For example, the display 1512 can also be referred to as a "screen" that can accommodate the presentation of multimedia content (e.g., music metadata, messages, wallpaper, graphics, etc.). The display 1512 can also display videos and can facilitate the generation, editing and sharing of video quotes. A serial I/O interface 1514 is provided in communication with the processor 1502 to facilitate wired and/or wireless serial communications (e.g., USB, and/or IEEE 1394) through a hardwire connection, and other serial input devices (e.g., a keyboard, keypad, and mouse). This supports updating and troubleshooting the mobile device 1500, for example. Audio capabilities are provided with an audio I/O component 1516, which can include a speaker for the output of audio signals related to, for example, indication that the user pressed the proper key or key combination to initiate the user feedback signal. The audio I/O component 1516 also facilitates the input of audio signals through a microphone to record data and/or telephony voice data, and for inputting voice signals for telephone conversations.

The mobile device 1500 can include a slot interface 1518 for accommodating a SIC (Subscriber Identity Component) in the form factor of a card Subscriber Identity Module (SIM) or universal SIM 1520, and interfacing the SIM card 1520 with the processor 1502. However, it is to be appreciated that the SIM card 1520 can be manufactured into the mobile device 1500, and updated by downloading data and software.

The mobile device 1500 can process IP data traffic through the communication component 1510 to accommodate IP traffic from an IP network such as, for example, the internet, a corporate intranet, a home network, a person area network, etc., through an ISP or broadband cable provider. Thus, VoIP traffic can be utilized by the mobile device 1500 and IP-based multimedia content can be received in either an encoded or decoded format.

A video processing component 1522 (e.g., a camera) can be provided for decoding encoded multimedia content. The video processing component 1522 can aid in facilitating the generation, editing and sharing of video quotes. The mobile device 1500 also comprises a power source 1524 in the form of batteries and/or an AC power subsystem, which power source 1524 can interface to an external power system or charging equipment (not shown) by a power I/O component 1526.

The mobile device 1500 can also include a video component 1530 for processing video content received and, for recording and transmitting video content. For example, the video component 1530 can facilitate the generation, editing and sharing of video quotes. A location tracking component 1532 facilitates geographically locating the mobile device 1500. As described hereinabove, this can occur when the user initiates the feedback signal automatically or manually. A user input component 1534 facilitates the user initiating the quality feedback signal. The user input component 1534 can also facilitate the generation, editing and sharing of video quotes. The user input component 1534 can include such conventional input device technologies such as a keypad, keyboard, mouse, stylus pen, and/or touch screen, for example.

Referring again to the applications 1506, a hysteresis component 1536 facilitates the analysis and processing of hysteresis data, which is utilized to determine when to associate with the access point. A software trigger component 1538 can be provided that facilitates triggering of the hysteresis component 1538 when the Wi-Fi transceiver 1513 detects the beacon of the access point. A SIP client 1540 enables the mobile device 1500 to support SIP protocols and register the subscriber with the SIP registrar server. The applications 1506 can also include a client 1542 that provides at least the capability of discovery, play and store of multimedia content, for example, music.

The mobile device 1500, as indicated above related to the communications component 1510, comprises an indoor network radio transceiver 1513 (e.g., Wi-Fi transceiver). This function supports the indoor radio link, such as IEEE 802.11, for the dual-mode GSM mobile device 1500. The mobile device 1500 can accommodate at least satellite radio services through a handset that can combine wireless voice and digital radio chipsets into a single handheld device.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. These components also can execute from various computer readable storage media comprising various data structures stored thereon. The components can communicate via local and/or remote processes such as in accordance with a signal comprising one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic data store, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a data store and/or any of the above computer-readable media.

As it employed in the subject specification, the term "processor" can refer to substantially any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of UE. A processor also can be implemented as a combination of computing processing units.

In the subject specification, terms such as "store," "data store," "data storage," "database," "repository," "queue", "storage device," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (comprising a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium comprising computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic data stores, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media.

Further, terms like "user equipment," "user device," "mobile device," "mobile," station," "access terminal," "terminal," "handset," and similar terminology, can generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "called party," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary," where used, is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature can be combined with one or more other features of the other implementations as may be desired and advantageous for any given or particular application. Furthermore, to the extent that the terms "have", "having", "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art can recognize that other embodiments comprising modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A device, comprising:
a processor; and
a memory that stores executable instructions that, when executed by the processor, facilitate performance of operations, comprising:
using an indicator associated with a call from a communication device, determining a first geographic area, associated with a service network, via which the call has originated;
determining a second geographic area based on an analysis of an area code of a caller identification number of the call;
in response to determining that the second geographic area is not consistent with the first geographic area according to a consistency criterion, sending a first message to network equipment associated with the service network, wherein the first message comprises a request to determine whether the caller identification number is registered with a provider entity associated with the service network; and
facilitating blocking the call.

2. The device of claim 1, wherein the indicator comprises an Internet Protocol address.

3. The device of claim 1, wherein the service network associated with the provider entity is a first service network operated by a first service provider entity, and wherein a call destination to which the call is directed is associated with a second service network operated by a second service provider entity.

4. The device of claim 3, wherein the operations further comprise:
querying first network equipment associated with the first service network to determine whether a caller identification number associated with the communication device is registered with the first service network.

5. The device of claim 4, wherein the operations further comprise:
in response to determining that the caller identification number is not registered with the first service network, performing the facilitating of the blocking of the call.

6. The device of claim 1, wherein the operations further comprise:
allowing a second call to connect to a call destination in response to the second call being determined not to be a spoofed call.

7. A method, comprising:
receiving, by network equipment comprising a processor, a call from a communication device directed to a call destination;
determining, by the network equipment, a first geographic area, associated with a service network, from which the call originated;
determining, by the network equipment, a second geographic area based on an examination of an area code of a caller identification number associated with the call;
in response to determining that the second geographic area is not consistent with the first geographic area based on a result of comparing the first geographic area with the second geographic area, sending, by the network equipment, a first message to a provider device of a provider entity associated with the service network, wherein the first message comprises a request to determine whether the caller identification number is registered with the provider entity to use the service network; and
facilitating, by the network equipment, a blocking of the call.

8. The method of claim 7, wherein the determining of the first geographic area associated with the service network from which the call originated is performed based on an indicator associated with the call.

9. The method of claim 8, wherein the indicator comprises an Internet Protocol address.

10. The method of claim 7, wherein the service network is a first service network operated by a first service provider entity, wherein the network equipment is associated with the first service network, and wherein the call destination is associated with a second service network operated by a second service provider entity.

11. The method of claim 10, further comprising:
facilitating, by the network equipment, querying service network equipment of the first service network to determine whether the caller identification number is registered with the first service network; and
in response to determining that the caller identification number is not registered with the first service network, performing, by the network equipment, the facilitating of the blocking of the call.

12. A non-transitory machine-readable storage medium comprising executable instructions that, when executed by a processor of network equipment, facilitate performance of operations, comprising:
receiving a call from a communication device directed to a call destination;
determining a first geographic area associated with a first service network via which the call has been routed;
determining a second geographic area based on an examination of an area code of a caller identification number of the call;
in response to determining that the second geographic area is inconsistent with the first geographic area, sending a first message to service network equipment associated with the first service network, wherein the first message comprises a request to determine whether the caller identification number is registered to use services enabled by a first service provider entity associated with the first service network; and
facilitating blocking the call.

13. The non-transitory machine-readable medium of claim 12, wherein the determining of the first geographic area associated with the first service network from which the call originates is performed based on an indicator associated with the call.

14. The non-transitory machine-readable medium of claim 13, wherein the indicator comprises an Internet Protocol address.

15. The non-transitory machine-readable medium of claim 12, wherein the operations further comprise:
querying the first service network to determine whether the caller identification number is registered with first network equipment of the first service network; and
in response to determining that the caller identification number is not registered with the first service network, performing the facilitating of the blocking of the call.

16. The non-transitory machine-readable medium of claim 12, wherein a network element that services the call resides in the first service network operated by the first service provider entity, and wherein the call destination is associated with a second service network operated by a second service provider entity.

17. The non-transitory machine-readable medium of claim 16, wherein the first service network comprises an Internet Protocol network.

18. The non-transitory machine-readable medium of claim 16, wherein the operations further comprise:
   querying the first service network to determine whether a caller identification number associated with the communication device is registered with the first service network.

19. The device of claim 1, wherein facilitating of the blocking of the call is in response to receiving a second message from the provider entity that the caller identification number is not registered with the provider entity.

20. The device of claim 1, wherein the operations further comprise:
   in response to receiving a second message from the provider entity that the caller identification number is registered with the provider entity, preventing the facilitating of the blocking of the call.

* * * * *